(12) United States Patent
Sasaki

(10) Patent No.: US 6,729,013 B2
(45) Date of Patent: May 4, 2004

(54) METHOD OF MANUFACTURING THIN-FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 286 days.

(21) Appl. No.: 09/969,624

(22) Filed: Oct. 4, 2001

(65) Prior Publication Data

US 2002/0007551 A1 Jan. 24, 2002

Related U.S. Application Data

(62) Division of application No. 09/379,509, filed on Aug. 23, 1999, now abandoned.

(30) Foreign Application Priority Data

Aug. 28, 1998 (JP) .............................. 10-244120

(51) Int. Cl.[7] .......................... G11B 5/127; H04R 31/00
(52) U.S. Cl. ................... 29/603.07; 29/603.11; 29/603.13; 29/603.15; 29/603.17; 360/126; 360/317
(58) Field of Search .................. 29/603.07, 603.11, 29/603.13–603.17; 360/126, 317

(56) References Cited

U.S. PATENT DOCUMENTS

| | | | | |
|---|---|---|---|---|
| 4,729,048 A | * | 3/1988 | Imakoshi et al. | ........ 360/234.7 |
| 5,754,377 A | * | 5/1998 | Gray et al. | ................. 360/126 |
| 5,798,890 A | | 8/1998 | Fontana, Jr. et al. | ........ 360/103 |
| 5,896,249 A | * | 4/1999 | Fontana et al. | .......... 360/234.5 |
| 5,911,455 A | | 6/1999 | Draaisma et al. | ........ 29/603.07 |

FOREIGN PATENT DOCUMENTS

| | | | | |
|---|---|---|---|---|
| JP | A-61-296518 | | 12/1986 | |
| JP | 01042014 A | * | 2/1989 | ............ G11B/5/31 |
| JP | A-3-95715 | | 4/1991 | |
| JP | A-6-203330 | | 7/1994 | |

OTHER PUBLICATIONS

"New solderless connection technology using light–setting insulation resin"; Nagao, K.; Nishihara, K.; Fujimoto, H.; Hatada, K.; 1994 IEMT Symposium., Sixteenth IEEE/CPMT International, Sep. 12–14, 1994; Page(s): 15–19 vol. 1.*

U.S. patent application Ser. No. 09/184,284, Sasaki, filed Nov. 1998.

* cited by examiner

*Primary Examiner*—A. Dexter Tugbang
*Assistant Examiner*—Paul D Kim
(74) *Attorney, Agent, or Firm*—Oliff & Berridge, PLC

(57) ABSTRACT

The invention allows a thin-film magnetic head that meets specifications required by the customer to be provided in a short period of time and manufacturing costs to be reduced. A slider of a magnetic head of the invention comprises two thin-film magnetic head element portions formed near an end face orthogonal to the direction of air flow. On the end face four pad-shaped electrodes are provided for electrically connecting the two head element portions to an external device. The electrodes are selectively connected to one of the head element portions through four conductors.

10 Claims, 17 Drawing Sheets

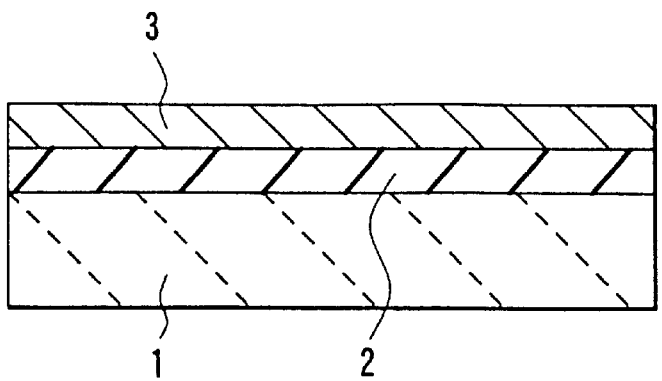
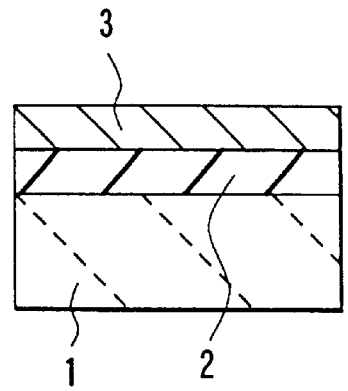
FIG. 1A    FIG. 1B
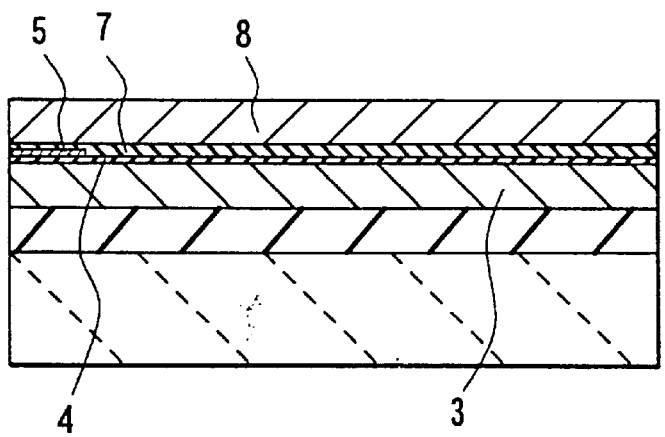
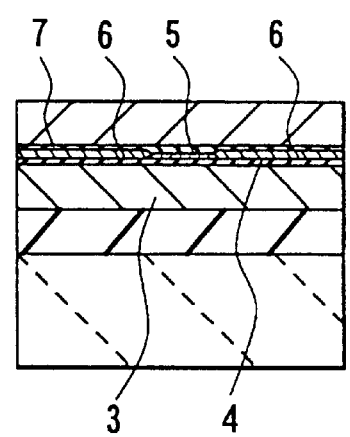
FIG. 2A    FIG. 2B
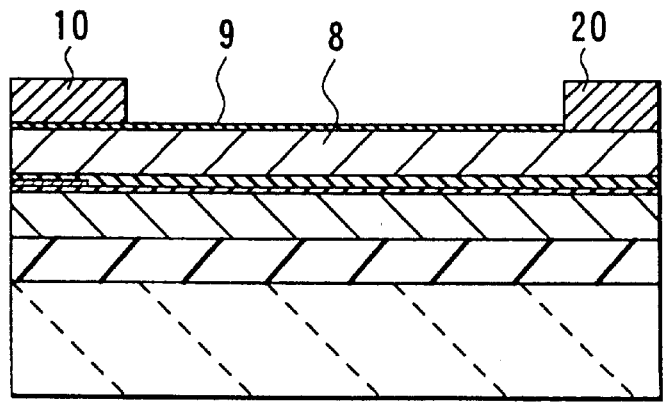
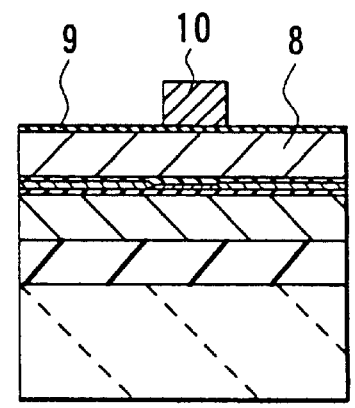
FIG. 3A    FIG. 3B

METHOD OF MANUFACTURING THIN-FILM MAGNETIC HEAD

This is a Division of application Ser. No. 09/379,509 filed Aug. 23, 1999 now abandoned. The entire disclosure of the prior application(s) is hereby incorporated by reference herein in its entirety.

BACKGROUND OF THE INVENTION

1. Field of Invention

The present invention relates to a method of manufacturing a thin-film magnetic head having a thin-film magnetic head element and a plurality of electrodes for electrically connecting the element to an external device.

2. Description of Related Art

Performance improvements in thin-film magnetic heads have been sought with an increase in surface recording density of a hard disk drive. A composite thin-film magnetic head has been widely used which is made of a layered structure including a recording head (which may be called a recording element in the following description) having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

In general, an AMR film is made of a magnetic substance that exhibits the MR effect and has a single-layer structure. In contrast, many of GMR films have a multilayer structure. There are several types of mechanisms of producing the GMR effect. The layer structure of a GMR film depends on the mechanism. GMR films include a superlattice GMR film, a spin valve film and a granular film. The spin valve film is most efficient since the film has a relatively simple structure, exhibits a great change in resistance in a low magnetic field, and suitable for mass production.

Besides selection of a material as described above, the pattern width such as the MR height, in particular, is one of the factors that determine the performance of a reproducing head. The MR height is the length (height) between the end of an MR element closer to the air bearing surface (medium facing surface) and the other end. The MR height is basically controlled by an amount of lapping when the air bearing surface is processed.

Performance improvements in a recording head have been expected, too, with performance improvements in a reproducing head. It is required to increase the track density of a magnetic recording medium in order to increase the recording density among the performances of a recording head. In order to achieve this, a recording head of a narrow track structure has been desired to be manufactured by processing the magnetic pole into the submicron order through the use of semiconductor process techniques. The magnetic pole made of a magnetic material having high saturation flux density has been desired in order to achieve the narrow-track recording head.

Another factor determining the recording head performance is the throat height. The throat height is the length (height) of the portion (called a pole portion in the present invention) between the air bearing surface and the edge of the insulating layer electrically isolating the thin-film coil. A reduction in throat height is desired in order to improve the recording head performance. The throat height is also controlled by an amount of lapping when the air bearing surface is processed.

As thus described, it is important to fabricate a recording head and a reproducing head appropriately balanced so as to improve performance of a thin-film magnetic head.

The manufacturing process of a thin-film magnetic head includes a wafer process for forming thin-film patterns on a wafer as a substrate and a lapping process for adjusting the throat height and the MR height by lapping. The wafer process includes a number of mask steps and steps of pattern formation by plating, sputtering, etching, and chemical mechanical polishing (CMP) and so on. The performance and characteristics of the thin-film magnetic head may be modified by changing the track width of the reproducing element and the track width of the recording element and so on. Therefore, thin-film magnetic heads that meet a variety of needs of customers may be manufactured by determining the track width of the reproducing element and that of the recording element and so on, using masks that satisfy required specifications.

The manufacturing process of a thin-film magnetic head includes a number of steps and it takes an extremely long period of time to manufacture one product. Therefore, in order to manufacture the magnetic head having the performance and characteristics that meet the needs of the customer, it is required to carefully work out a detailed production plan so that the performance and characteristics of the magnetic head may be changed by photomask selection.

However, the needs of the customers are not limited to those relating to the performance and characteristics of the thin-film magnetic head that are determined in the wafer process but embrace the needs relating to a slider for retaining the magnetic head element and flying over the surface of a hard disk platter. The needs of the customers for a slider may be, for example, whether to choose a side element type slider or a center element type slider. The side element type slider is a slider wherein a thin-film magnetic head element is formed near an end of the slider in the direction orthogonal to the direction of air flow. The center element type slider is a slider wherein a thin-film magnetic head element is formed in the center of the slider in the direction orthogonal to the direction of air flow. The side element type slider and the center element type slider are typical sliders. In these days sliders are tend to be largely categorized into the above two types for satisfying the demand for the floating characteristics over the surface of the hard disk platter.

Reference is now made to FIG. 25 to FIG. 28 for describing the side element type slider and the center element type slider.

FIG. 25 is a schematic front view of a surface of the side element type slider in which a thin-film magnetic head element is formed. FIG. 26 is a schematic bottom view of the air bearing surface of the side element type slider. In FIG. 26 the arrow indicated with numeral 120 shows the direction of air flow. 'LE' indicates the air inflow end. 'TR' indicates the air outflow end. In the side element type slider, as shown in FIG. 25 and FIG. 26, a thin-film magnetic head element 111 is formed near an end of the slider in the direction orthogonal to the direction of air flow, in the vicinity of an end face (end face of air outflow end TR in this example) 110 orthogonal to the direction of air flow. On the end face 110, four pad-shaped electrodes 112 are provided for electrically connecting the magnetic head element 111 to an external device. The four electrodes 112 are connected to the magnetic head element 111 through four conductors 113. A rail 115 is formed in the air bearing surface of the slider.

FIG. 27 is a schematic front view of a surface of the center element type slider in which a thin-film magnetic head element is formed. FIG. 28 is a schematic bottom view of the air bearing surface of the center element type slider. Numeral 120, 'LE' and 'TR' of FIG. 28 are similar to those of FIG. 26. In the center element type slider, as shown in FIG. 27 and FIG. 28, the thin-film magnetic head element 111 is formed in the middle of the slider in the direction orthogonal to the direction of air flow, in the vicinity of an end face (end face of air outflow end TR in this example) 110 orthogonal to the direction of air flow. On the end face 110, the four pad-shaped electrodes 112 are provided for electrically connecting the magnetic head element 111 to an external device. The four electrodes 112 are connected to the magnetic head element 111 through the four conductors 113. The rail 115 is formed in the air bearing surface of the slider.

However, it is impossible to change between the side element type slider and the center element type slider by simply changing a photomask in an intermediate step in the manufacturing process of the thin-film magnetic head. It is therefore required in related-art techniques to prepare different sets of masks for the respective types of sliders and separately manufacture the sliders in volume.

In a hard disk drive for high density recording, a plurality of hard disk platters such as four or six platters are placed on top of one another. FIG. 29 illustrates an arrangement of thin-film magnetic heads in such a hard disk drive using a plurality of platters. A plurality of hard disk platters 122 are held by a rotating axis 121 in such a hard disk drive. The hard disk drive includes a thin-film magnetic head (called an up-type magnetic head in the following description) 123, placed beneath the platter 122, whose medium facing surface faces upward; and a thin-film magnetic head (called a down-type magnetic head in the following description) 124, placed above the platter 122, whose medium facing surface faces downward. The up-type magnetic head 123 and the down-type magnetic head 124 are coupled to a moving arm 125 through a suspension 126. The structural difference between the up-type magnetic head 123 and the down-type magnetic head 124 is the difference in position of the reproducing element and the recording element.

Accordingly, two kinds of thin-film magnetic heads, that is, the up-type head and the down-type head are required for each of the side element type slider and the center element type slider. The total of four kinds of thin-film magnetic heads are thus required. In the related art different sets of masks for twenty to thirty mask processing steps are prepared for each kind of magnetic head and magnetic heads of each kind are produced in volume. In a planned production, different mass-production lots are prepared for the respective kinds of magnetic heads for manufacturing magnetic heads that meet the customer's needs.

In the related art thus described, thin-film magnetic heads are produced, using different masks or different mass-production lots for the respective kinds of magnetic heads. As a result, a cycle time, that is, a period of time between an order and a shipment is long and manufacturing costs are raised.

In particular, modifications and improvements in specifications of hard disk drives are made in a short period of time in these days. The customers of thin-film magnetic heads therefore demand that the magnetic heads that meet desired specifications are supplied shortly after the order. Consequently, the manufacturer of thin-film magnetic heads is required to manufacture a variety of products in small quantities that meet specifications demanded by the customers in a short period of time. The above-mentioned problems are therefore noticeable.

Where the related-art techniques are used, there are many cases in which specifications required by the customer are modified in the course of mass-production of thin-film magnetic heads meeting the specifications and mass-production is required to be restarted from the first step. Consequently, waste results and manufacturing costs are raised.

Where the related-art techniques are used, the manufacturer of thin-film magnetic heads estimates the number of products to be ordered by the customer and specifications required and mass-produces magnetic heads prior to the order, in some cases, in order to strictly maintain the product shipping schedule of the customer or to beat the competitors by immediate delivery. However, the number of products ordered by the customer and specifications required may go far beyond the estimates of the manufacturer since the customer may quickly respond to the users' needs. In such a case the manufacturer has to keep a number of undelivered stocks and to produce new mass-production lots that meet the demand of the customer extremely quickly, regardless of the average cycle time. Since the specifications required by the customer or those of a final product change every six months, for example, in these days, undelivered products in stock for a couple of months are equivalent to nonconforming stocks to be wasted. Mass-production disregarding the average cycle time affects the balance of the mass-production line and reduces the mass-production capacities.

In Japanese Patent Application Laid-open Sho 61-296518 (1986) and Japanese Patent Application Laid-open Hei 3-95715(1991), a techniques is disclosed for forming a slider having two head elements, a plurality of terminals common to the two head elements, and a plurality of conductors for connecting the head elements to the terminals. Some of the conductors connecting one of the head elements that is not used to the terminals are then cut off. However, the technique requires a step of cutting off the conductors in the manufacturing process of the thin-film magnetic head and the number of steps increases.

In Japanese Patent Application Laid-open Hei 6-203330 (1994), a technique is disclosed for fabricating a slider having two head elements, one terminal commonly used for the two head elements, and two terminals corresponding to the respective two head elements. However, the technique requires the terminals for the respective head elements that are not commonly used for the head elements. It is therefore difficult to reduce the size of the thin-film magnetic head.

SUMMARY OF THE INVENTION

It is an object of the invention to provide a method of manufacturing a thin-film magnetic head for providing a thin-film magnetic head that meets specifications required by the customer in a short period of time and reducing manufacturing costs.

A thin-film magnetic head of the invention comprises: a main body wherein a thin-film magnetic head element is to be formed; a plurality of thin-film magnetic head element portions formed in the main body, each including a main part of the thin-film magnetic head element; a plurality of electrodes, formed in the main body, for electrically connecting any of the element portions to an external device; and a plurality of conductors, formed in the main body, provided only between selected one of the element portions and the electrodes, for electrically connecting the selected one of the element portions to the electrodes.

According to the thin-film magnetic head of the invention, selected one of the element portions is electrically connected to the electrodes through the conductors. As a result, thin-film magnetic heads of several types of specifications may be selectively provided.

In the thin-film magnetic head of the invention the thin-film magnetic element portions may each include: first and second magnetic layers magnetically coupled to each other and each made up of at least one layer and including pole portions placed in regions of the magnetic layers on a side of surfaces thereof facing a recording medium, the pole portions being opposed to each other; a gap layer placed between the pole portion of the first magnetic layer and the pole portion of the second magnetic layer; and a thin-film coil at least part of which is placed between the first and second magnetic layers, the part of the coil being insulated from the first and second magnetic layers. In addition, the conductors may be connected to the thin-film coil.

In the thin-film magnetic head of the invention the thin-film magnetic head element portions may each comprise a magnetoresistive element and the conductors may be connected to the magnetoresistive element.

The thin-film magnetic head of the invention may further comprise intermediate connecting portions, provided for the respective thin-film magnetic head element portions and connected to the element portions, to which the conductors are selectively connected.

In the thin-film magnetic head the main body may include a surface facing a recording medium and part of each of the element portions may be placed in the surface facing the recording medium.

A method of manufacturing a thin-film magnetic head of the invention includes the steps of: forming a plurality of thin-film magnetic head element portions in a section to be a main body wherein a thin-film magnetic head element is to be formed in a substrate, the element portion each including a main part of the thin-film magnetic head element; forming a plurality of electrodes, in the section to be the main body, for electrically connecting any of the element portions to an external device; and forming a plurality of conductors only between selected one of the element portions and the electrodes, in the section to be the main body, for electrically connecting selected one of the element portions to the electrodes.

According to the method of manufacturing a thin-film magnetic head of the invention, selected one of the element portions is electrically connected to the electrodes through the conductors. As a result, thin-film magnetic heads of several types of specifications may be selectively provided.

In the method the step of forming the electrodes may be performed either before or after the step of forming the conductors.

In the method the thin-film magnetic element portions may each include: first and second magnetic layers magnetically coupled to each other and each made up of at least one layer and including pole portions placed in regions of the magnetic layers on a side of surfaces thereof facing a recording medium, the pole portions being opposed to each other; a gap layer placed between the pole portion of the first magnetic layer and the pole portion of the second magnetic layer; and a thin-film coil at least part of which is placed between the first and second magnetic layers, the part of the coil being insulated from the first and second magnetic layers. In addition, the conductors may be connected to the thin-film coil.

In this case, in the method of the invention, the step of forming the element portions includes the steps of: forming the first magnetic layer, forming the gap layer on the pole portion of the first magnetic layer; forming the thin-film coil on the first magnetic layer, the coil being insulated from the first magnetic layer; and forming the second magnetic layer on the gap layer and the thin-film coil, the second magnetic layer being insulated from the coil.

In the method the thin-film magnetic head element portions may each comprise a magnetoresistive element. The conductors may be connected to the magnetoresistive element.

The method may further include, before the step of forming the conductors, the step of forming intermediate connecting portions for the respective thin-film magnetic head element portions, connected to the element portions, to which the conductors are selectively connected. The conductors may be connected to the intermediate connecting portions corresponding to selected one of the element portions.

In the method the main body may include a surface facing a recording medium and part of each of the element portions may be placed in the surface facing the recording medium in the step of forming the element portions.

In the method, if the element portions each include the first and second magnetic layers, the gap layer and the thin-film coil, the step of forming the conductors may be performed simultaneously with the step of forming the thin-film coil or with the step of forming the second magnetic layer, or may be performed after the step of forming the second magnetic layer.

A thin-film magnetic head sub-structure of the invention comprises a plurality of thin-film magnetic head element portions formed in a section to be a main body wherein a thin-film magnetic head element is to be formed in a substrate, the element portions each having a main part of the thin-film magnetic head element, the element portions being selectively and electrically connected through a plurality of conductors to a plurality of electrodes providing electrical connection between any one of the element portions and an external device, the conductors being formed only between the one of the element portions and the electrodes.

According to the thin-film magnetic head sub-structure, selected one of the element portions is electrically connected to the electrodes through the conductors, using the sub-structure. As a result, thin-film magnetic heads of several types of specifications may be selectively manufactured.

The thin-film magnetic head sub-structure may further comprise the electrodes.

In the thin-film magnetic head sub-structure the thin-film magnetic element portions may each comprise at least part of an induction-type magnetic transducer having first and second magnetic layers magnetically coupled to each other and each made up of at least one layer and including pole portions placed in regions of the magnetic layers on a side of surfaces thereof facing a recording medium, the pole portions being opposed to each other, a gap layer placed between the pole portion of the first magnetic layer and the pole portion of the second magnetic layer, and thin-film coil at least part of which is placed between the first and second magnetic layers, the part of the coil being insulated from the first and second magnetic layers.

In the thin-film magnetic head sub-structure the thin-film magnetic head element portions may each comprise a magnetoresistive element.

The thin-film magnetic head sub-structure may further comprise intermediate connecting portions, provided for the respective thin-film magnetic head element portions and connected to the element portions, to which the conductors are selectively connected.

In the thin-film magnetic head sub-structure the main body may include a surface facing a recording medium and part of each of the element portions may be placed in the surface facing the recording medium.

A method of manufacturing a thin-film magnetic head sub-structure of the invention includes the step of forming a plurality of thin-film magnetic head element portions formed in a section to be a main body wherein a thin-film magnetic head element is to be formed in a substrate, the element portions each having a main part of the thin-film magnetic head element, the element portions being selectively and electrically connected through a plurality of conductors to a plurality of electrodes providing electrical connection between any one of the element portions and an external device, the conductors being formed only between the one of the element portions and the electrodes.

According to the method of manufacturing a thin-film magnetic head sub-structure of the invention, a sub-structure comprising a plurality of element portions may be manufactured. Selected one of the element portions is electrically connected to the electrodes through the conductors, using the sub-structure. As a result, thin-film magnetic heads of several types of specifications may be selectively manufactured.

The method may further include the step of forming the electrodes.

In the method the thin-film magnetic element portions may each comprise at least part of an induction-type magnetic transducer having first and second magnetic layers magnetically coupled to each other and each made up of at least one layer and including pole portions placed in regions of the magnetic layers on a side of surfaces thereof facing a recording medium, the pole portions being opposed to each other, a gap layer placed between the pole portion of the first magnetic layer and the pole portion of the second magnetic layer, and thin-film coil at least part of which is placed between the first and second magnetic layers, the part of the coil being insulated from the first and second magnetic layers.

In the method the thin-film magnetic head element portions may each comprise a magnetoresistive element.

The method may further include the step of forming intermediate connecting portions for the respective thin-film magnetic head element portions, the connecting portions being connected to the element portions, the conductors being selectively connected to the connecting portions.

In the method the main body may include a surface facing a recording medium and part of each of the element portions may be placed in the surface facing the recording medium in the step of forming the element portions.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing the main part of a composite thin-film magnetic head common to embodiments of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

DETAILED DESCRIPTION OF PREFERRED EMBODIMENTS

Figures 4A, 4B:
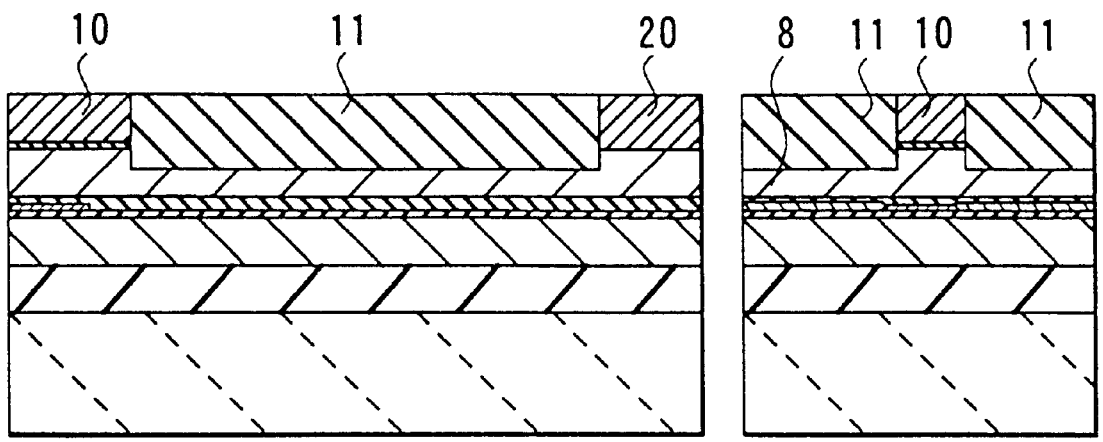
FIG. 4A and FIG. 4B are cross sections for illustrating a step that follows FIG. 3A and FIG. 3B.

Preferred embodiments of the invention will now be described in detail with reference to the accompanying drawings. The following embodiments are examples wherein the invention is applied to composite thin-film magnetic heads.

Reference is now made to FIG. 1A to FIG. 6A and FIG. 1B to FIG. 6B to describe a method of manufacturing the main part of a composite thin-film magnetic head that is common to the following embodiments. FIG. 1A to FIG. 6A are cross sections each orthogonal to an air bearing surface of the thin-film magnetic head. FIG. 1B to FIG. 6B are cross sections each parallel to the air bearing surface of the pole portion of the thin-film magnetic head. The configuration and the manufacturing method that will be described with reference to the drawings are those of an example of the thin-film magnetic head of the invention.

In the method of manufacturing the thin-film magnetic head, as shown in FIG. 1A and FIG. 1B, an insulating layer 2 made of alumina ($Al_2O_3$), for example, of about 5 to 10 $\mu$m in thickness is deposited on a substrate 1 made of aluminum oxide and titanium carbide ($Al_2O_3$-TiC), for example. Next, a bottom shield layer 3 made of a magnetic material for a reproducing head is formed on the insulating layer 2.

Next, as shown in FIG. 2A and FIG. 2B, on the bottom shield layer 3 alumina of 100 to 200 nm in thickness, for example, is deposited through sputtering to form a bottom shield gap film 4 as an insulating layer. On the bottom shield gap film 4 an MR film having a thickness of tens of nanometers is formed for making up an MR element 5 for reproducing. The MR film is then etched by ion milling, for example, with a photoresist pattern as a mask to form the MR element 5. The MR element 5 may be either a GMR element or an AMR element. Next, an electrode layer 6 to be electrically connected to the MR element 5 is formed on the bottom shield gap film 4 through the lift-off method, for example. Next, a top shield gap film 7 as an insulating layer is formed on the bottom shield gap film 4, the MR element 5, and the electrode layer 6. The MR element 5 is then embedded in the shield gap films 4 and 7. Next, on the top shield gap film 7 a top shield layer-cum-bottom pole layer (called a top shield layer in the following description) 8 made of a magnetic material, having a thickness of about 3 $\mu$m, for example, is formed. The top shield layer 8 is used for both reproducing head and recording head.

Next, as shown in FIG. 3A and FIG. 3B, a recording gap layer 9 made of an insulating film of alumina, for example, having a thickness of about 200 nm, for example, is formed on the top shield layer 8. A contact hole is then formed in the backward portion (the right-side region of FIG. 3A) by partially etching the recording gap layer 9 for forming a magnetic path. Next, on the recording gap layer 9 in the pole portion, a pole tip 10 having a thickness of 0.5 to 1 $\mu$m is formed for a recording head. The pole tip 10 is made of a magnetic material such as Permalloy (NiFe) or FeN as a high saturation flux density material and forms part of the top pole. At the same time, a magnetic layer 20 made of a magnetic material is formed for making the magnetic path on the contact hole for making the magnetic path.

Next, as shown in FIG. 4A and FIG. 4B, the recording gap layer 9 and the top shield layer (bottom pole layer) 8 are etched by ion milling with the pole tip 10 as a mask. As shown in FIG. 4B, the sidewalls of the top pole (the pole tip 10), the recording gap layer 9 and part of the top shield layer (bottom pole layer) 8 are formed vertically in a self-aligned manner. Such a structure is called a trim structure. The trim structure suppresses an increase in the effective track width due to expansion of the magnetic flux generated during writing in a narrow track.

Next, an insulating layer 11 of alumina, for example, having a thickness of about 3 $\mu$m is formed over the entire surface. The insulating layer 11 is then polished to the surfaces of the pole tip 10 and the magnetic layer 20 and flattened. The polishing method may be either mechanical polishing or chemical mechanical polishing (CMP). The surfaces of the pole tip 10 and the magnetic layer 20 are exposed through this flattening process.

Figures 5A, 5B:
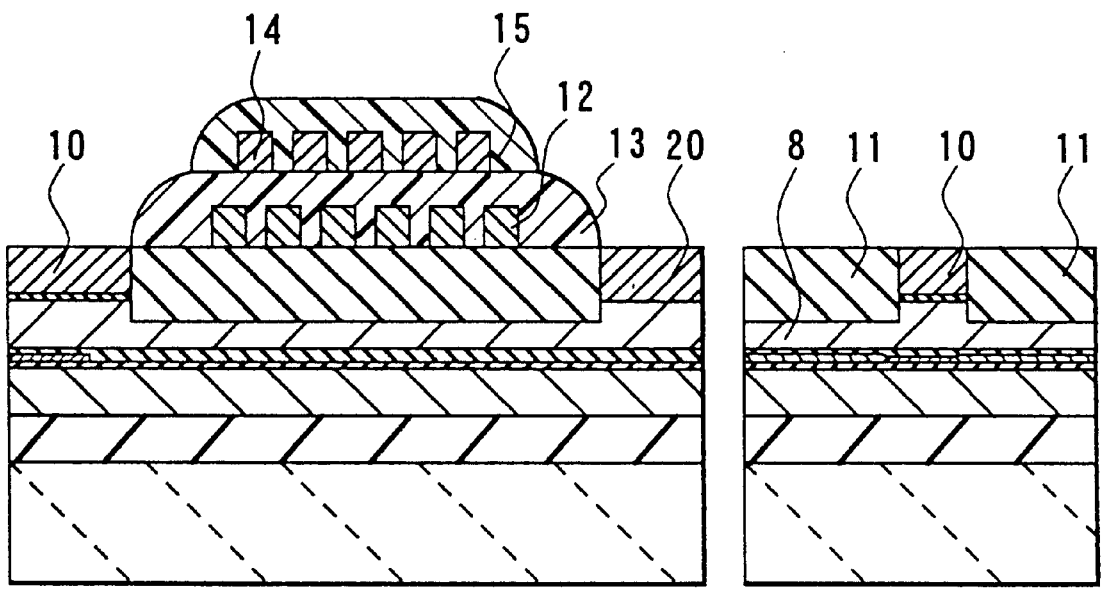
FIG. 5A and FIG. 5B are cross sections for illustrating a step that follows FIG. 4A and FIG. 4B.

Next, as shown in FIG. 5A and FIG. 5B, on the flattened insulating layer 11, a thin-film coil 12 of a first layer made of copper (Cu), for example, is formed through plating, for example, for an induction recording head. Next, a photoresist layer 13 of a specific pattern is formed on the insulating layer 11 and the coil 12. Heat treatment at a temperature of 250 to 300° C., for example, is performed to flatten the surface of the photoresist layer 13. Next, on the photoresist layer 13, a thin-film coil 14 of a second layer, made of copper, for example, is formed through plating, for example. Next, a photoresist layer 15 of a specific pattern is formed on the photoresist layer 13 and the coil 14. Heat treatment at a temperature of 250 to 300° C., for example, is performed to flatten the surface of the photoresist layer 15.

Figures 6A, 6B:
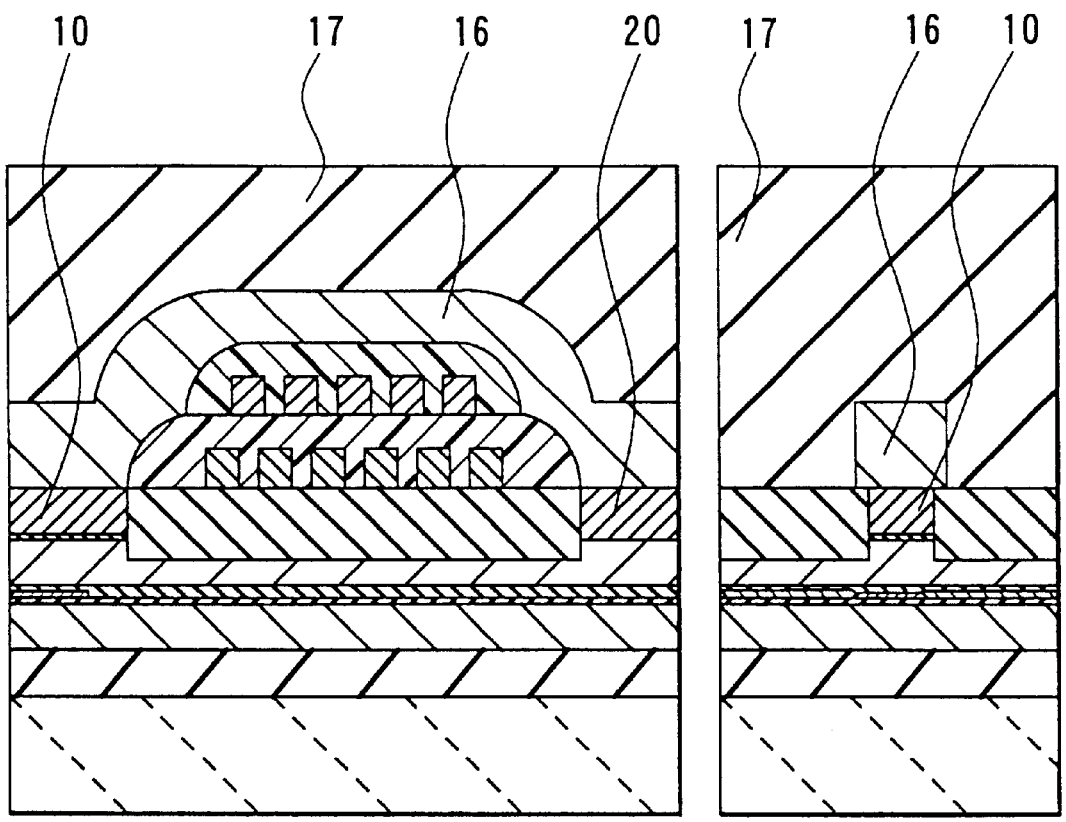
FIG. 6A and FIG. 6B are cross sections for illustrating a step that follows FIG. 5A and FIG. 5B.

Next, as shown in FIG. 6A and FIG. 6B, a top pole layer 16 made of a magnetic sub-structure such as Permalloy is formed for a recording head on the pole tip 10, the photoresist layers 13 and 15, and the magnetic layer 20. An overcoat layer 17 of alumina, for example, is then formed over the top pole layer 16. Finally, mechanical processing of the slider is performed and the air bearing surface of the recording head and the reproducing head is formed. The thin-film magnetic head is thus completed.

First Embodiment

Figure 7:
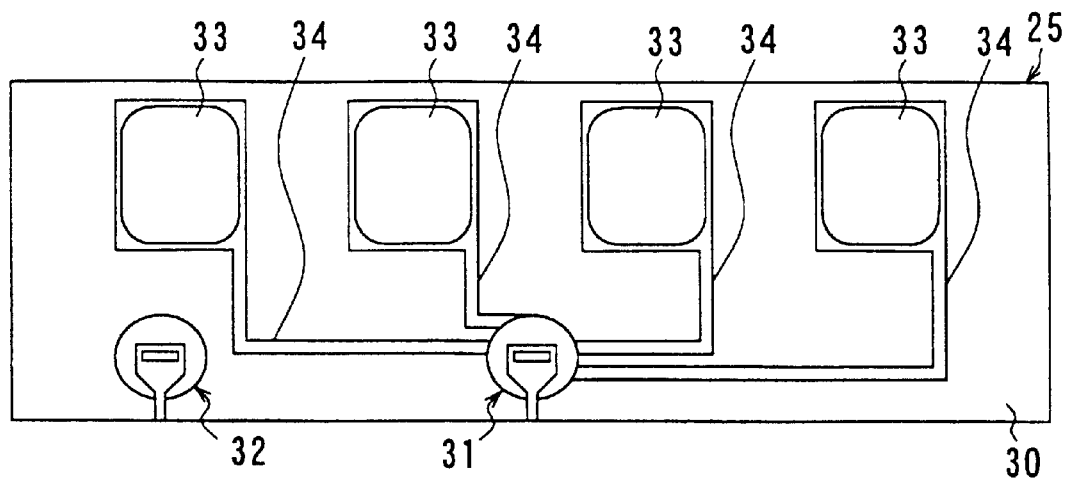
FIG. 7 is a schematic front view of the surface of the center element type slider of a first embodiment of the invention in which thin-film magnetic head element portions are formed.
Figure 8:
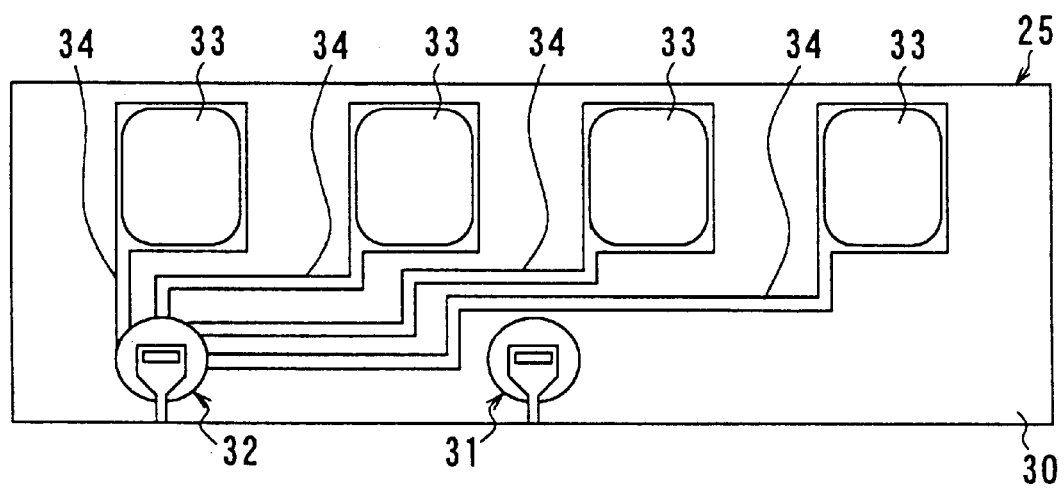
FIG. 8 is a schematic front view of the surface of the side element type slider of the first embodiment in which thin-film magnetic head element portions are formed.
Figure 9:
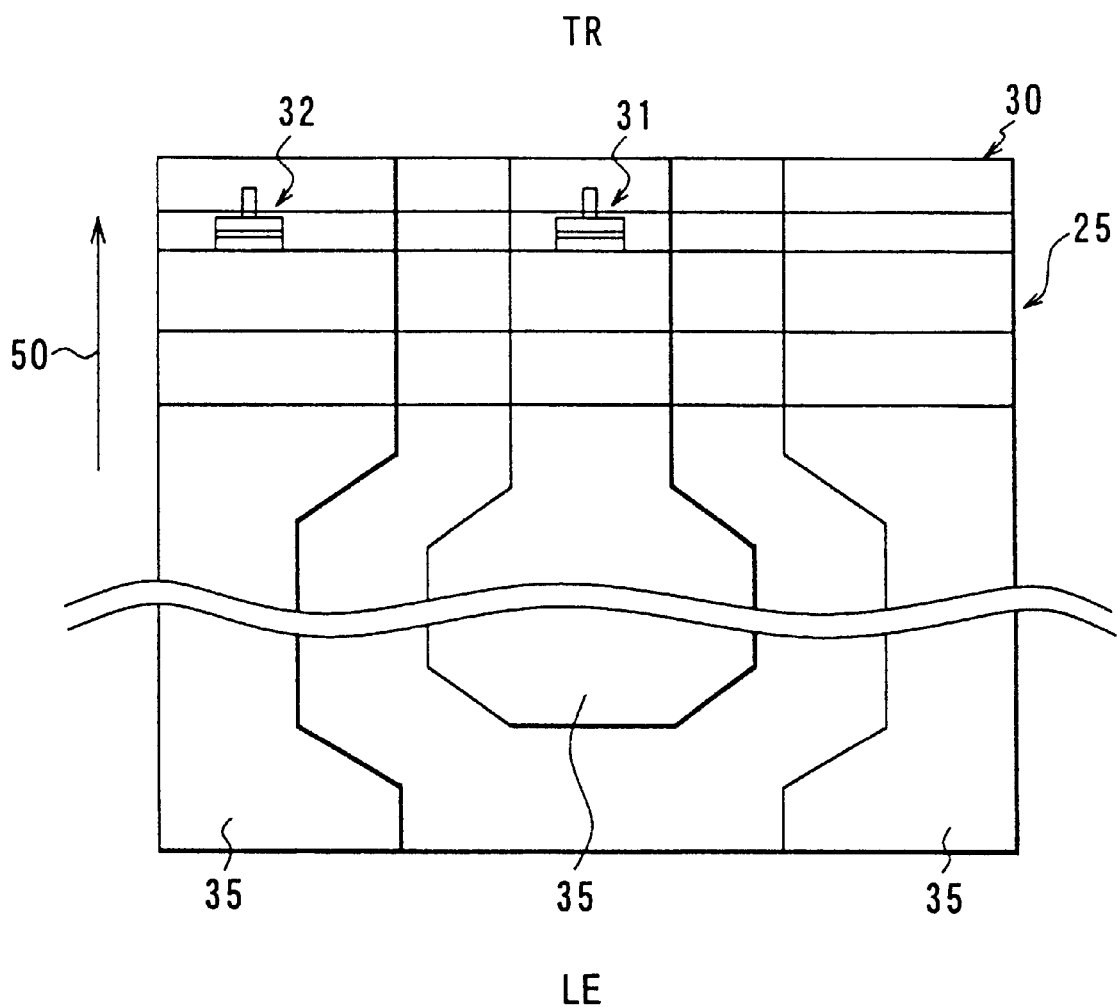
FIG. 9 is a schematic bottom view of the air bearing surface of the slider of the first embodiment.

Reference is now made to FIG. 7 to FIG. 9 to describe a thin-film magnetic head and a method of manufacturing the same, and a thin-film magnetic head sub-structure and a method of manufacturing the same of a first embodiment of the invention. According to the embodiment, two thin-film magnetic head element portions are formed in one slider, that is, in a portion to be a main body of a thin-film magnetic head on a substrate. The two thin-film magnetic head element portions each include a main part of a thin-film magnetic head element for a center element type, and a main part of a thin-film magnetic head element for a side element type. Selection between the center element type and the side element type is allowed by determining the pattern of conductors between the thin-film magnetic head element portions and electrodes.

FIG. 7 and FIG. 8 are schematic front views of the surface of the slider of the embodiment in which the thin-film magnetic head element portions are formed. FIG. 7 illustrates the center element type. FIG. 8 illustrates the side element type. FIG. 9 is a schematic bottom view of the air bearing surface of the slider of the embodiment. In FIG. 9 the arrow indicated with numeral 50 shows the direction of air flow. 'LE' indicates the air inflow end. 'TR' indicates the air outflow end. As shown in FIG. 7 to FIG. 9, the thin-film magnetic head of the embodiment comprises a slider 25 that flies over the surface of a recording medium (hard disk platter). The slider 25 corresponds to a main body of the invention. In the slider 25 two thin-film magnetic head element portions 31 and 32 are formed near an end face 30 orthogonal to the direction of air flow, part of each of the head element portions 31 and 32 being placed in the surface that faces a recording medium. The one thin-film magnetic head element portion 31 is provided for the center element type. The head element portion 31 is formed in the middle of the slider in the direction orthogonal to the direction of air flow. The other thin-film magnetic head element portion 32 is provided for the side element type. The head element portion 32 is formed near an end of the slider in the direction orthogonal to the direction of air flow (on the left side in FIG. 7 to FIG. 9).

On the end face 30 four pad-shaped electrodes 33 are provided for electrically connecting the head element portions 31 and 32 to an external device. The electrodes 33 are electrically connected to either the head element portion 31 or 32 through four conductors 34. In this embodiment the four conductors 34 are formed only between the electrodes 33 and a selected one of the head element portions 31 and 32. As shown in FIG. 7, if the head element portion 31 is connected to the electrodes 33 through the conductors 34, the thin film magnetic head for the center element type is obtained. As shown in FIG. 8, if the head element portion 32 is connected to the electrodes 33 through the conductors 34, the thin film magnetic head for the side element type is obtained.

Rails 35 are formed in the air bearing surface of the slider 25.

An example of the basic configuration of the head element portions 31 and 32 is shown in FIG. 6A and FIG. 6B. The head element portions 31 and 32 each include the MR element 5 for reading and the induction magnetic transducer for writing. The induction magnetic transducer includes: the first and second magnetic layers magnetically coupled to each other and each made up of at least one layer and including pole portions placed in regions of the magnetic layers on a side of surfaces thereof facing a recording medium; the gap layer 9 placed between the pole portion of the first magnetic layer and the pole portion of the second magnetic layer; and the thin-film coils 12 and 14 at least part of which is placed between the first and second magnetic layers, being insulated from the magnetic layers. In the embodiment the top shield layer (bottom pole layer) 8 corresponds to the first magnetic layer. The pole tip 10, the top pole layer 16 and the magnetic layer 20 correspond to the second magnetic layer.

Two of the four conductors 34 shown in FIG. 7 or FIG. 8 are connected to the thin-film coils 12 and 14. The remaining two are connected to the MR element 5 through the electrode layer 6.

In the embodiment the step of forming the conductors 34 may be performed simultaneously with the steps of forming the thin-film coils 12 and 14 or with the step of forming the top pole layer 16 as the second magnetic layer.

Figure 10:
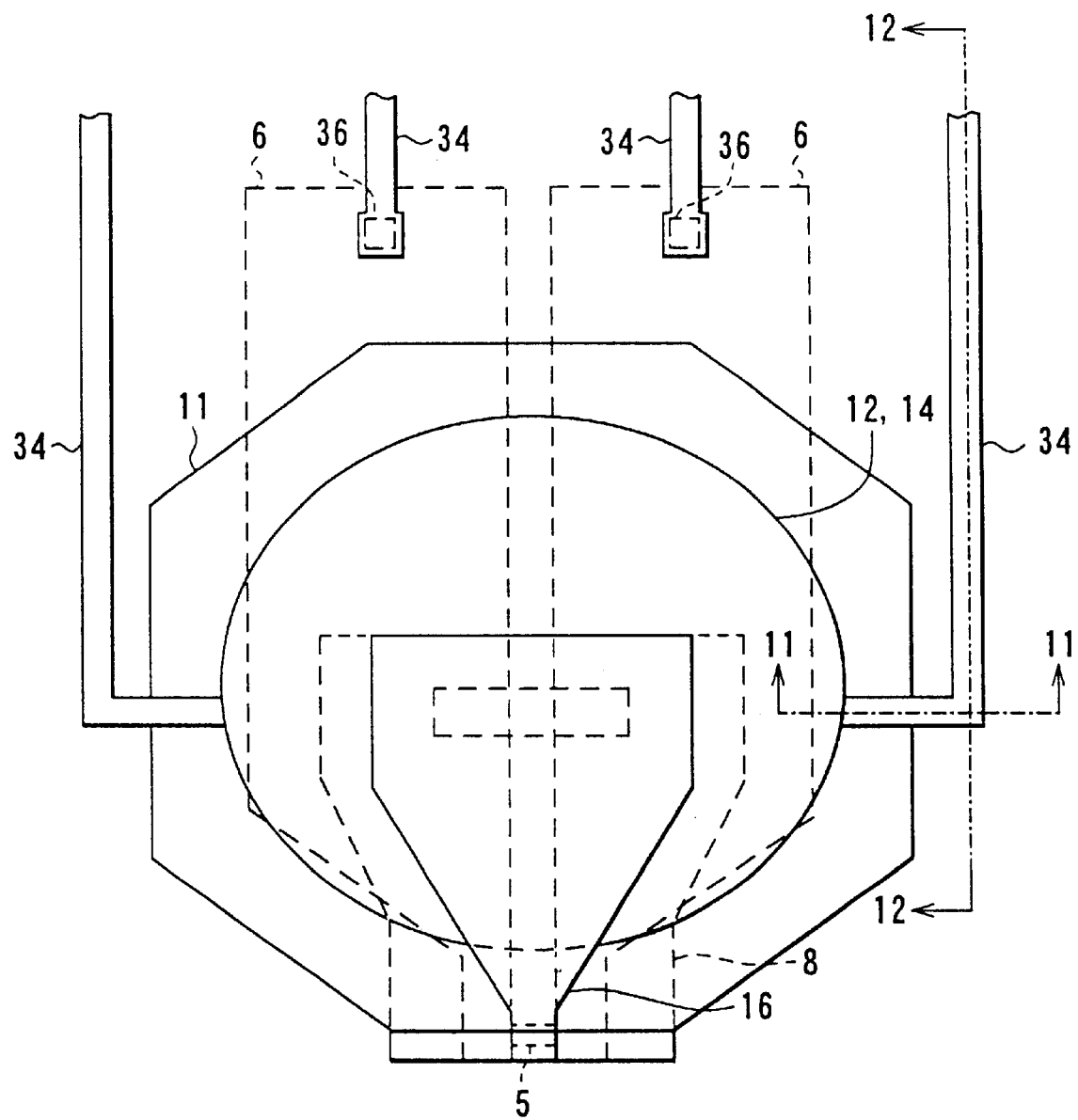
FIG. 10 is a top view of the head element portions wherein the step of forming the conductors are performed simultaneously with the steps of forming thin-film coils in the first embodiment.
Figure 11:
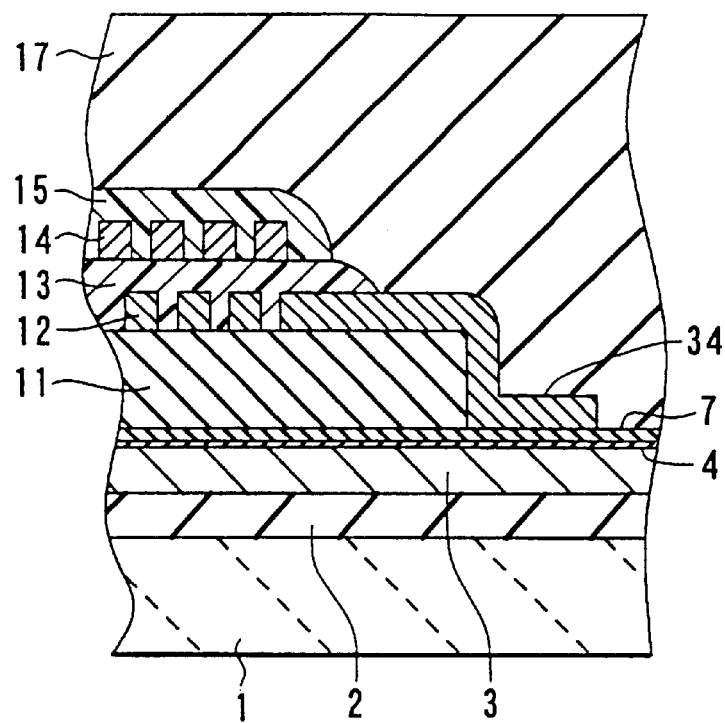
FIG. 11 is a cross section taken along line 11—11 of FIG. 10.
Figure 12:
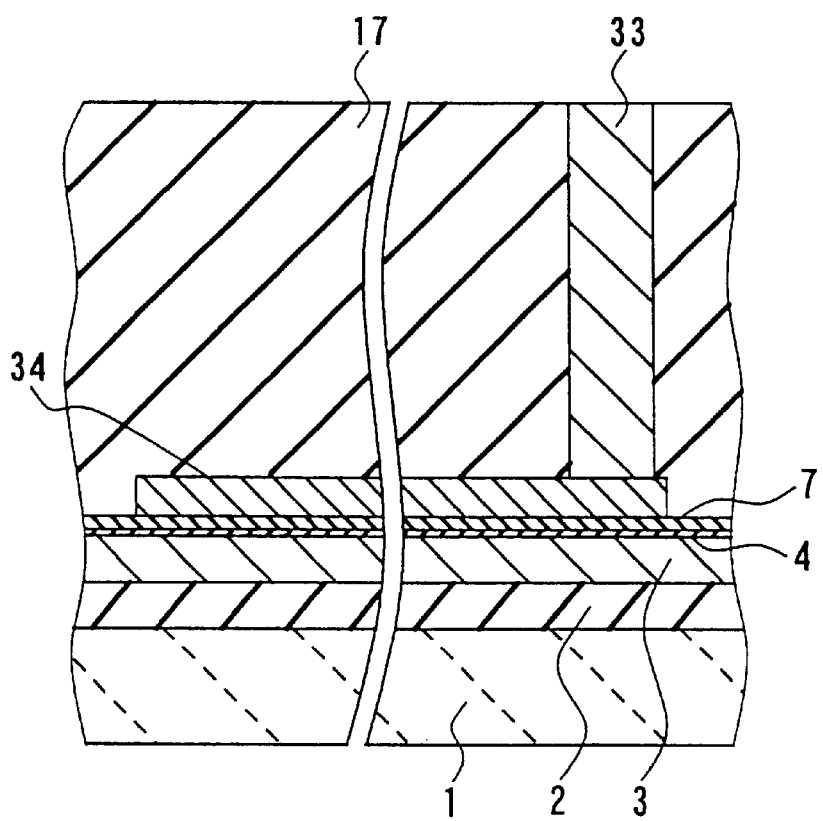
FIG. 12 is a cross section taken along line 12—12 of FIG. 10.

Reference is now made to FIG. 10 to FIG. 12 to describe a method of forming the conductors 34 and the electrodes 33 wherein the step of forming the conductors 34 are performed simultaneously with the steps of forming the thin-film coils 12 and 14. FIG. 10 is a top view of the head element portions 31 and 32. FIG. 11 is a cross section taken along line 11—11 of FIG. 10. FIG. 12 is a cross section taken along line 12—12 of FIG. 10.

According to the method, the head element portions 31 and 32 are manufactured through one kind of steps until the step prior to the steps of forming the thin-film coils 12 and 14. Contact holes or via holes 36 are each formed for providing connection to the electrode layer 6 near the element portions 31 and 32, respectively, in the top shield gap film 7 (not shown in FIG. 10). In the steps of forming the thin-film coils 12 and 14, the four conductors 34 of the material the same as the thin-film coils 12 and 14 are formed by plating, for example, on the top shield gap film 7. Two of the four conductors 34 are connected to the thin-film coils 12 and 14 of the element portion to be used. The remaining two of the four conductors 34 are each connected to the electrode layer 6 of the element portion to be used through the contact hole 36 formed in the top shield gap film 7, and further connected to the MR element 5 of the element portion to be used through the electrode layer 6. The pole tip 10, the top pole layer 16 and the magnetic layer 20 as the second magnetic layer are then fabricated.

In the steps of forming the thin-film coils 12 and 14 and the steps of forming the second magnetic layer, the thin-film coils 12 and 14 and the second magnetic layer of the head element portion 31 or 32 which is to be used may be only formed.

Next, before forming the overcoat layer 17, the columnar electrodes (bumps) 33 made of copper, for example, are formed by plating, for example. The electrodes 33 are formed such that the lower ends thereof are connected to the conductors 34. The overcoat layer 17 is then formed to cover the electrodes 33. The top surface of the overcoat layer 17 is then ground to expose the top surfaces of the electrodes 33. Gold (Au) may be sputtered on the exposed top surfaces of the electrodes 33 for preventing oxidation (rusting), if necessary.

According to the method, the two types of thin-film magnetic heads are easily manufactured by preparing the only two types of photomasks corresponding to the patterns of the conductors 34 at least in the steps of forming the thin-film coils 12 and 14 among the steps of forming the coils 12 and 14 and the step of forming the second magnetic layer.

Figure 13:
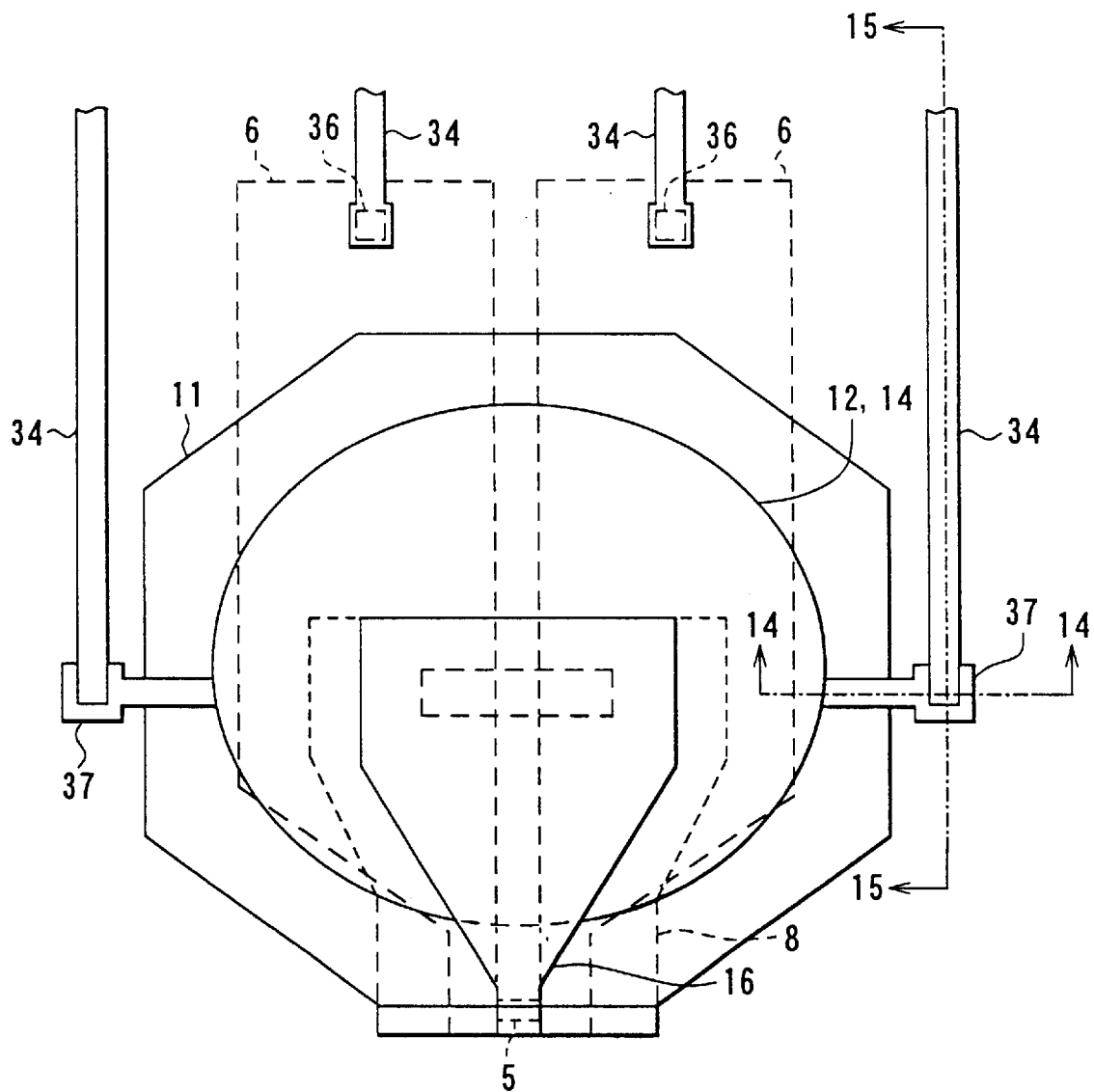
FIG. 13 is a top view of the head element portions wherein the step of forming the conductors are performed simultaneously with the step of forming the top pole layer in the first embodiment.
Figure 14:
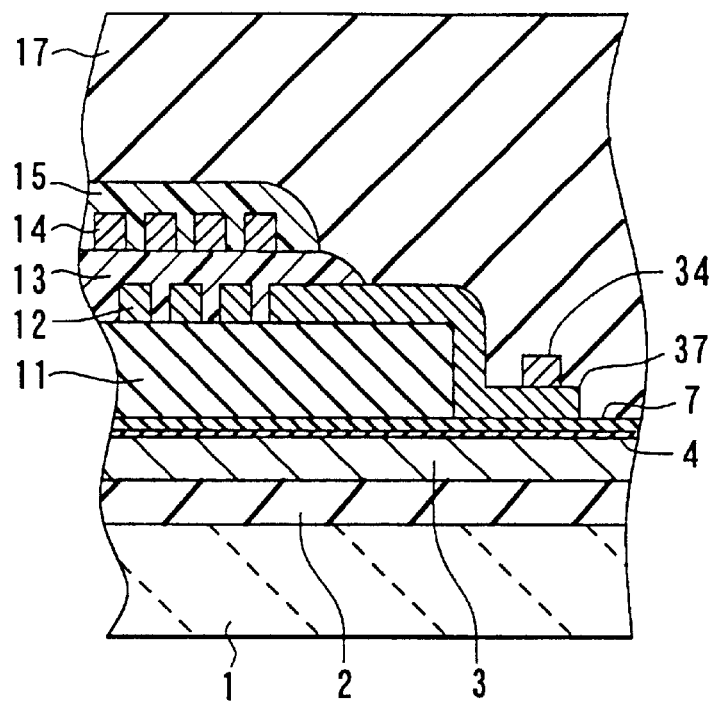
FIG. 14 is a cross section taken along line 14—14 of FIG. 13.
Figure 15:
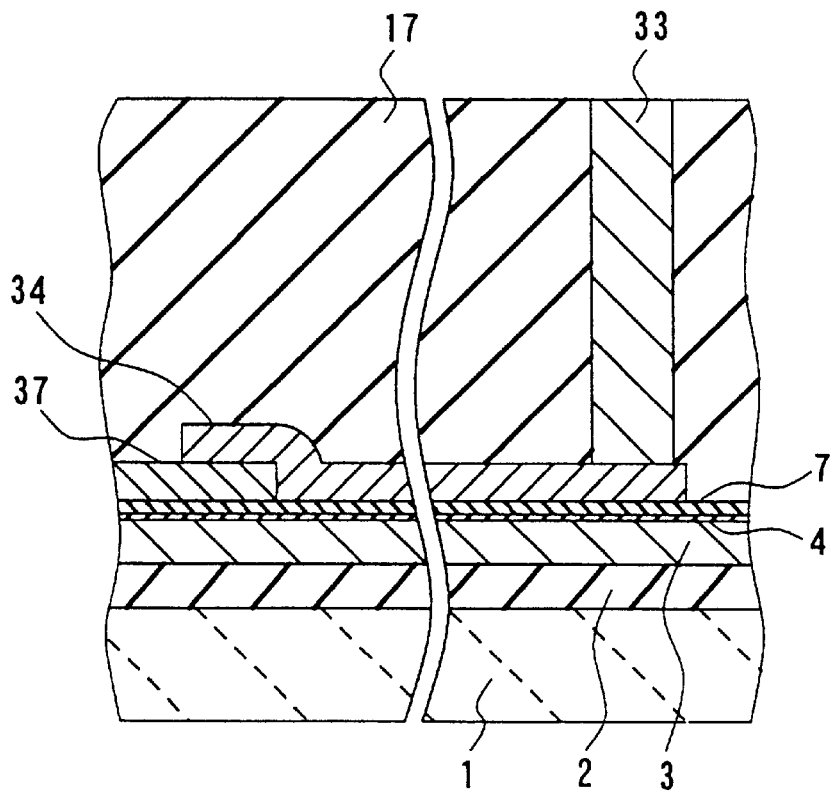
FIG. 15 is a cross section taken along line 15—15 of FIG. 13.

Reference is now made to FIG. 13 to FIG. 15 to describe a method of forming the conductors 34 and the electrodes 33 wherein the step of forming the conductors 34 are performed simultaneously with the step of forming the top pole layer 16. FIG. 13 is a top view of the head element portions 31 and 32. FIG. 14 is a cross section taken along line 14—14 of FIG. 13. FIG. 15 is a cross section taken along line 15—15 of FIG. 13.

According to the method, the head element portions 31 and 32 are manufactured through one kind of steps until the steps of forming the pole tip 10 and the magnetic layer 20. The contact holes 36 are each formed for providing connection to the electrode layer 6 near the element portions 31 and 32, respectively, in the top shield gap film 7 (not shown in FIG. 13). In the steps of forming the thin-film coils 12 and 14, intermediate terminals 37 are formed near the element portions 31 and 32. The intermediate terminals 37 are connected to the thin-film coils 12 and 14 of each of the element portions 31 and 32. The conductors 34 are selectively connected to the intermediate terminals 37. The intermediate terminals 37 and the contact holes 36 described above correspond to intermediate connecting portions of the invention. Alternatively, in place of the intermediate terminals 37, contact holes may be formed in the photoresist layers 13 and 15 for providing connection to the thin-film coils 12 and 14.

In the step of forming the top pole layer 16, the four conductors 34 of the material the same as the top pole layer 16 are formed by plating, for example, on the top shield gap film 7. Two of the four conductors 34 are each connected to the thin-film coils 12 and 14 of the element portion to be used through the intermediate terminal 37 or a contact hole. The remaining two of the four conductors 34 are each connected to the electrode layer 6 of the element portion to be used through the contact hole 36 formed in the top shield gap film 7, and further connected to the MR element 5 of the element portion to be used through the electrode layer 6.

In the step of forming the top pole layer 16, the top pole layer 16 of the head element portion 31 or 32 which is to be used may be only formed.

Next, before forming the overcoat layer 17, the columnar electrodes (bumps) 33 are formed by plating, for example. The electrodes 33 are formed such that the lower ends thereof are connected to the conductors 34. The overcoat layer 17 is then formed to cover the electrodes 33. The top surface of the overcoat layer 17 is then ground to expose the top surfaces of the electrodes 33. Gold (Au) may be sputtered on the exposed top surfaces of the electrodes 33 for preventing oxidation (rusting), if necessary.

According to the method, the two types of thin-film magnetic heads are easily manufactured by preparing the only two types of photomasks corresponding to the patterns of the conductors 34 in the step of forming the top pole layer 16.

In the embodiment the intermediate product in the stage immediately before formation of the conductors 34, manufactured through the one series of steps, corresponds to a thin-film magnetic head sub-structure of the invention.

According to the embodiment thus described, the two thin-film magnetic head element portions 31 and 32 for the center element type and the side element type, respectively, are formed in the one slider, that is, in the portion to be the main body of the thin-film magnetic head on the substrate. Selection between the center element type magnetic head and the side element type magnetic head is allowed by determining the pattern of the conductors 34 between the head element portions 31 and 32 and the electrodes 33. As a result, the embodiment allows the two head element portions 31 and 32 to be formed in advance through the one kind of process, that is, with the one kind of photomask. The intermediate product (the thin-film magnetic head sub-structure) thereby obtained may be kept in stock common to the center element type and the side element type. On receiving an order from the customer, either the center element type magnetic head or the side element type magnetic head may be manufactured, in response to the customer's demand, by changing part of the steps that follow, that is, by changing only some of the photomasks.

According to the embodiment thus described, it is possible to provide the thin-film magnetic head that meets specifications required by the customer in a short period of time. Furthermore, the embodiment allows most of the photomasks to be common to the center element type and the side element type. Mass-production lots and intermediate products are prevented from being wasted and manufacturing costs are reduced.

In the techniques disclosed in Japanese Patent Application Laid-open Sho 61-296518(1986) and Japanese Patent Application Laid-open Hei 3-95715(1991), a step is required for cutting off the conductors connecting one of the head elements that is not used to the terminals. In contrast, the embodiment of the invention does not require such a step and an increase in the number of steps is prevented in the manufacturing process of the thin-film magnetic head.

According to the embodiment, while the two head elements 31 and 32 are provided in the one slider 25, the electrodes 33 for one of the head elements are only formed in the slider 25. The thin-film magnetic head is thereby reduced in size.

Second Embodiment

Figure 16:
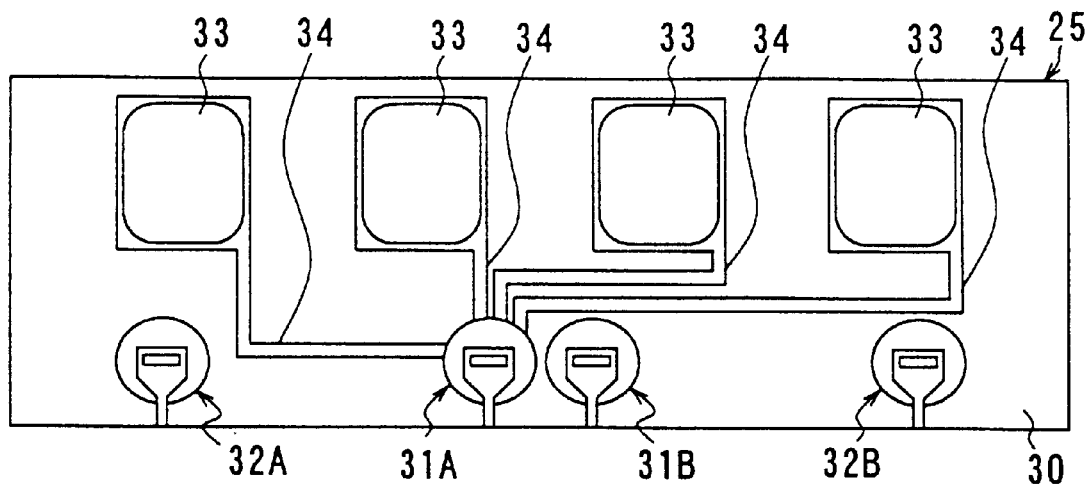
FIG. 16 is a schematic front view of the surface of the up type of the center element type slider of a second embodiment of the invention in which thin-film magnetic head element portions are formed.
Figure 17:
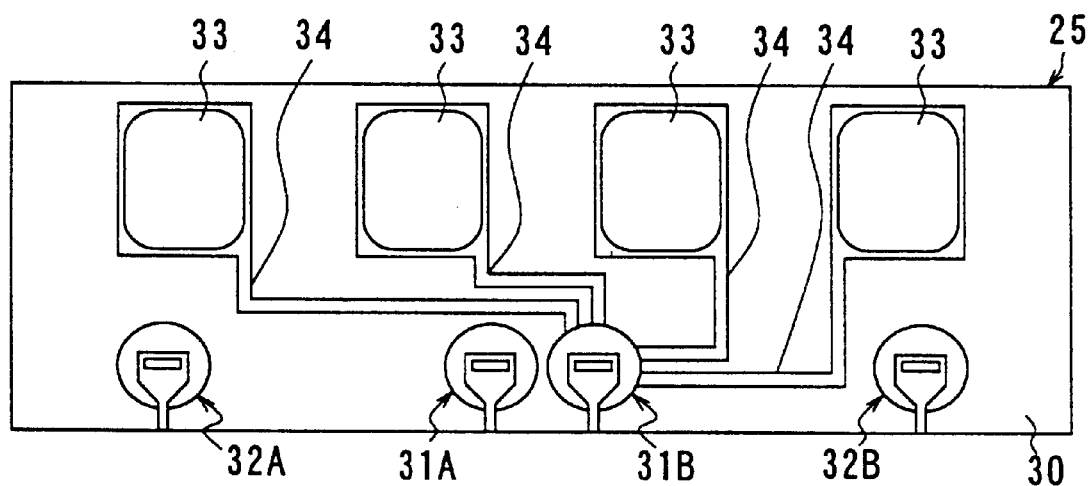
FIG. 17 is a schematic front view of the surface of the down type of the center element type slider of the second embodiment in which thin-film magnetic head element portions are formed.
Figure 18:
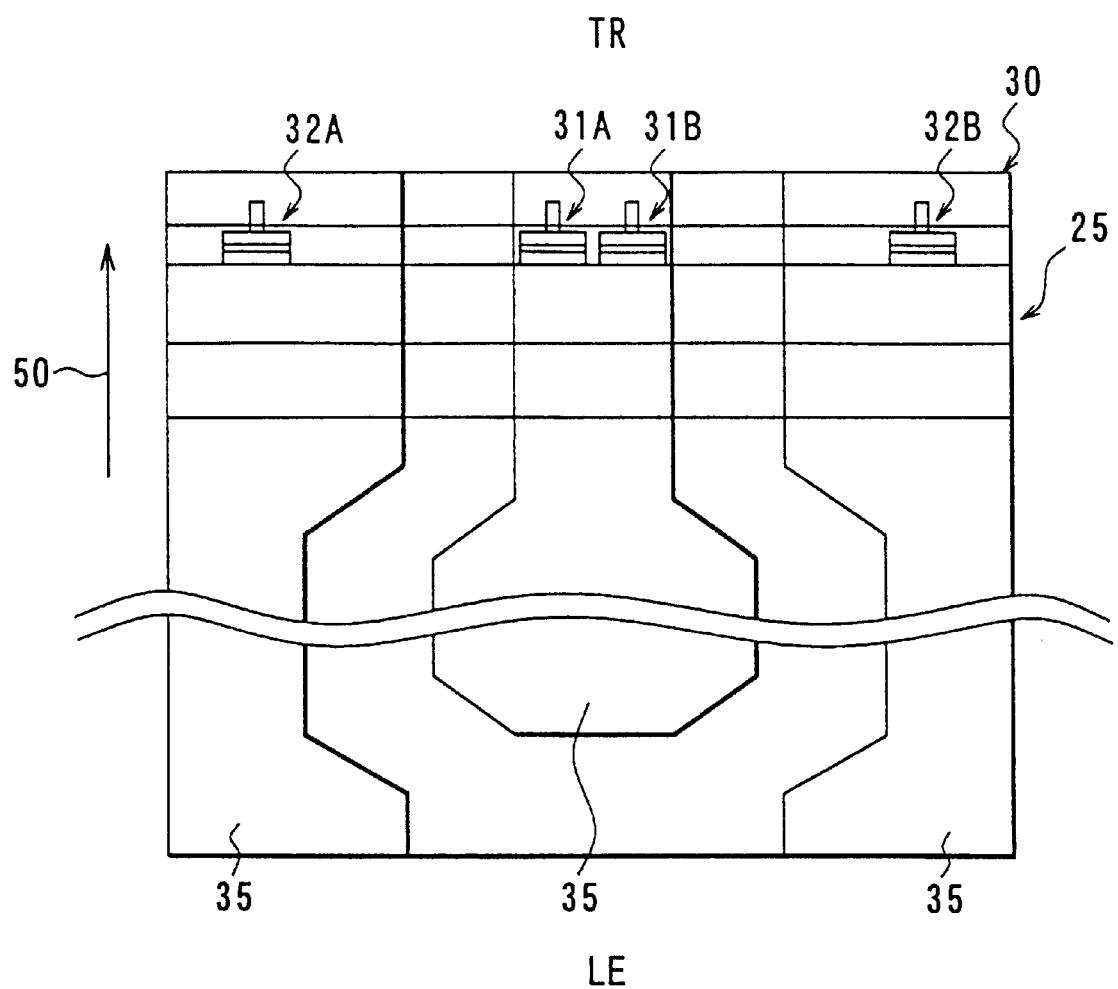
FIG. 18 is a schematic bottom view of the air bearing surface of the slider of the second embodiment.

Reference is now made to FIG. 16 to FIG. 18 to describe a thin-film magnetic head and a method of manufacturing the same, and a thin-film magnetic head sub-structure and a method of manufacturing the same of a second embodiment of the invention. According to the embodiment, four thin-film magnetic head element portions are formed in one slider. The four thin-film magnetic head element portions include a portion for the up type of the center element type, a portion for the down type of the center element type, a portion for the up type of the side element type, and a portion for the down type of the side element type. Selection of any of the four types is allowed by determining the pattern of conductors between the thin-film magnetic head element portions and electrodes.

FIG. 16 and FIG. 17 are schematic front views of the surface of the slider of the embodiment in which the thin-film magnetic head element portions are formed. FIG. 16 shows the up type of the center element type. FIG. 17 shows the down type of the center element type. FIG. 18 is a schematic bottom view of the air bearing surface of the slider of the embodiment. In FIG. 18 the arrow indicated with numeral 50 shows the direction of air flow. 'LE' indicates the air inflow end. 'TR' indicates the air outflow end. As shown in FIG. 16 to FIG. 18, in the thin-film magnetic head of the embodiment, the four thin-film magnetic head element portions 31A, 31B, 32A and 32B are formed near the end face 30 of the slider 25 orthogonal to the direction of air flow. The head element portions 31A and 31B are provided for the center element type and each formed in the middle of the slider in the direction orthogonal to the direction of air flow. The head element portion 31A is provided for the up type. The head element portion 31B is provided for the down type. The head element portions 32A and 32B are provided for the side element type and each formed near each end of the slider in the direction orthogonal to the direction of air flow. The head element portion 32A is provided for the up type. The head element portion 32B is provided for the down type. An example of the basic configuration of the head element portions 31A, 31B, 32A and 32B is shown in FIG. 6A and FIG. 6B.

On the end face 30 the four pad-shaped electrodes 33 are provided for electrically connecting the head element portions 31A, 31B, 32A and 32B to an external device. The electrodes 33 are selectively and electrically connected to any of the head element portions 31A, 31B, 32A and 32B through the four conductors 34. As shown in FIG. 16, if the head element portion 31A is connected to the electrodes 33 through the conductors 34, the up-type thin film magnetic head for the center element type is obtained. As shown in FIG. 17, if the head element portion 31B is connected to the electrodes 33 through the conductors 34, the down-type thin film magnetic head for the center element type is obtained. Although not shown, if the head element portion 32A is connected to the electrodes 33 through the conductors 34, the up-type thin film magnetic head for the side element type is obtained. If the head element portion 32B is connected to the electrodes 33 through the conductors 34, the down-type thin film magnetic head for the side element type is obtained.

In the embodiment the intermediate product in the stage immediately before formation of the conductors 34, manufactured through the one series of steps, corresponds to the thin-film magnetic head sub-structure of the invention.

The remainder of configuration of the thin-film magnetic head and manufacturing method thereof and configuration of the thin-film magnetic head sub-structure and manufacturing method thereof of the second embodiment are similar to those of the first embodiment.

According to the embodiment, the four types of thin-film magnetic heads are easily manufactured by preparing only four types of photomasks in part of the manufacturing steps. The remainder of effects of the second embodiment are similar to those of the first embodiment.

Third Embodiment

Reference is now made to FIG. 19 to FIG. 24 to describe a thin-film magnetic head and a method of manufacturing the same, and a thin-film magnetic head sub-structure and a method of manufacturing the same of a third embodiment of the invention. According to the embodiment, as in the second embodiment, the four thin-film magnetic head element portions are formed in one slider. The four thin-film magnetic head element portions include a portion for the up type of the center element type, a portion for the down type of the center element type, a portion for the up type of the side element type, and a portion for the down type of the side element type. Selection of any of the four types is allowed by determining the pattern of conductors between the thin-film magnetic head element portions and electrodes.

Figure 19:
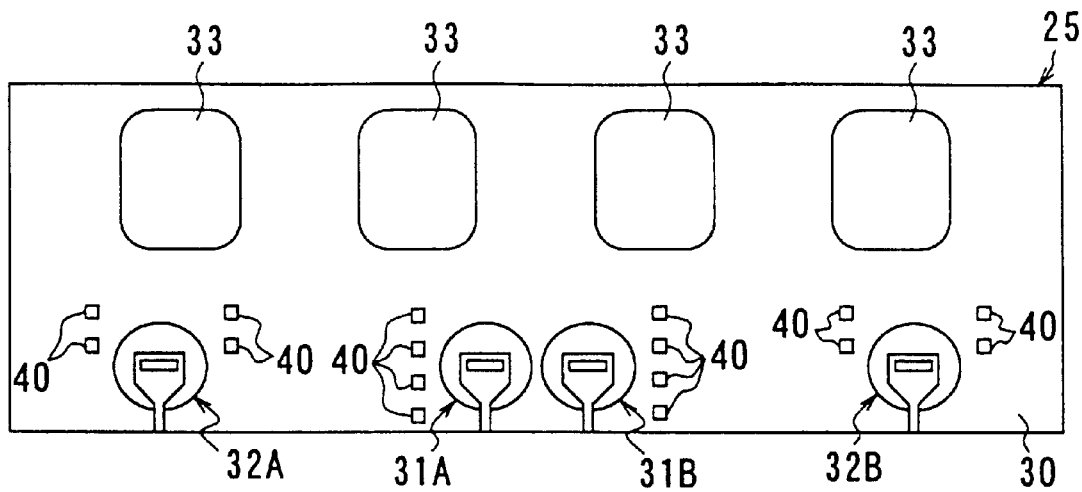
FIG. 19 is a schematic front view of the surface of the slider of a third embodiment of the invention in which thin-film magnetic head element portions are formed.

FIG. 19 is a schematic front view of the surface of the slider of the embodiment in which the thin-film magnetic head element portions are formed. FIG. 19 shows the state immediately before formation of the conductors. As shown, in the thin-film magnetic head of the embodiment, the four thin-film magnetic head element portions 31A, 31B, 32A and 32B are formed near the end face 30 of the slider 25 orthogonal to the direction of air flow, as in the second embodiment. On the end face 30 the four pad-shaped electrodes 33 are provided for electrically connecting the head element portions 31A, 31B, 32A and 32B to an external device. In the thin-film magnetic head of the embodiment, four intermediate connecting portions 40 are further provided in the end face 30 for the respective element portions 31A, 31B, 32A and 32B in the neighborhood thereof. The intermediate connecting portions 40 are connected to the element portions 31A, 31B, 32A and 32B. The conductors 34 are selectively connected to the intermediate connecting portions 40.

In the embodiment, the top surfaces of the intermediate connecting portions 40 and the electrodes 33 are exposed from the end face 30 before the conductors 34 are formed. Any of the four types of magnetic heads is obtained by selectively connecting the electrodes 33 to the intermediate connecting portions 40 of any of the element portions 31A, 31B, 32A and 32B through the conductors 34.

Figure 20:
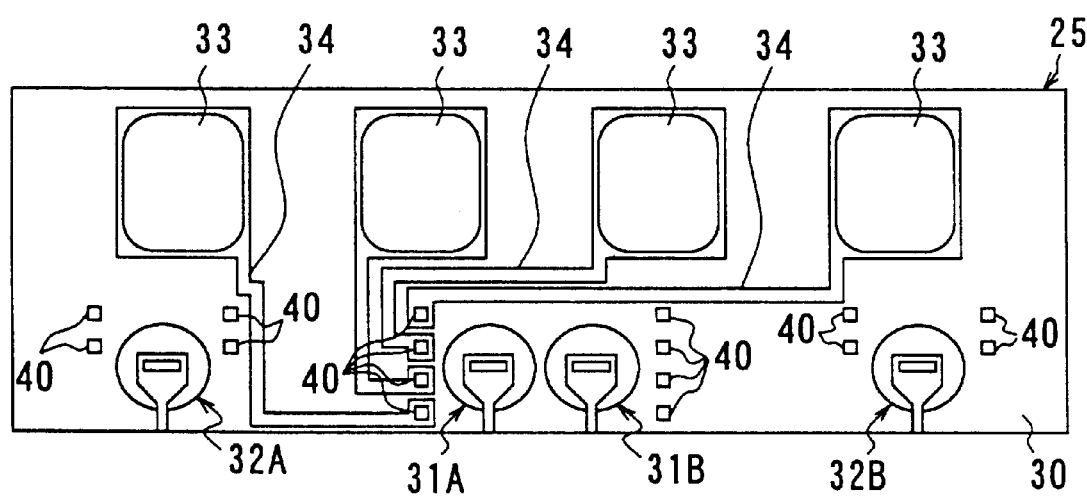
FIG. 20 is a schematic front view of the surface of the up type of the center element type slider of the third embodiment in which thin-film magnetic head element portions are formed.

As shown in FIG. 20, if the intermediate connecting portions 40 of the head element portion 31A are connected to the electrodes 33 through the conductors 34, the up-type thin film magnetic head for the center element type is obtained.

Figure 21:
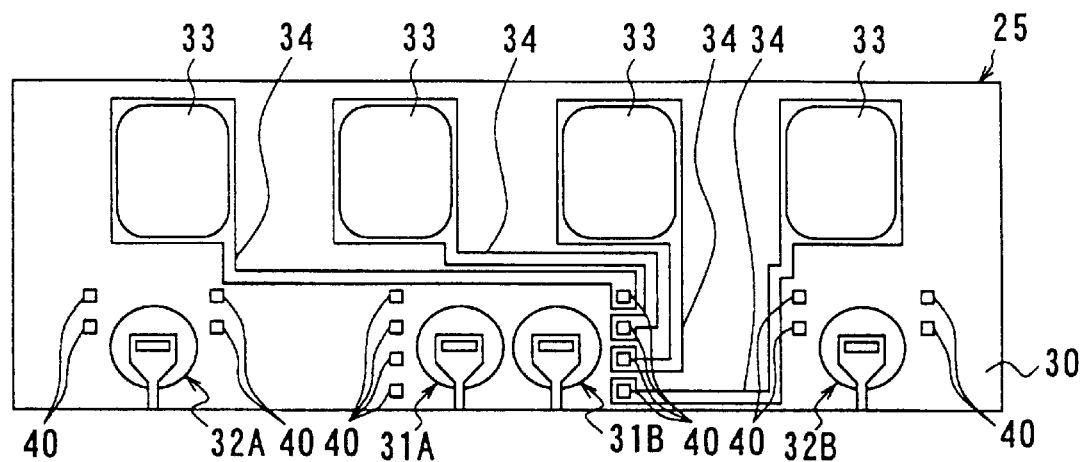
FIG. 21 is a schematic front view of the surface of the down type of the center element type slider of the third embodiment in which thin-film magnetic head element portions are formed.

As shown in FIG. 21, if the intermediate connecting portions 40 of the head element portion 31B are connected to the electrodes 33 through the conductors 34, the down-type thin film magnetic head for the center element type is obtained.

Figure 22:
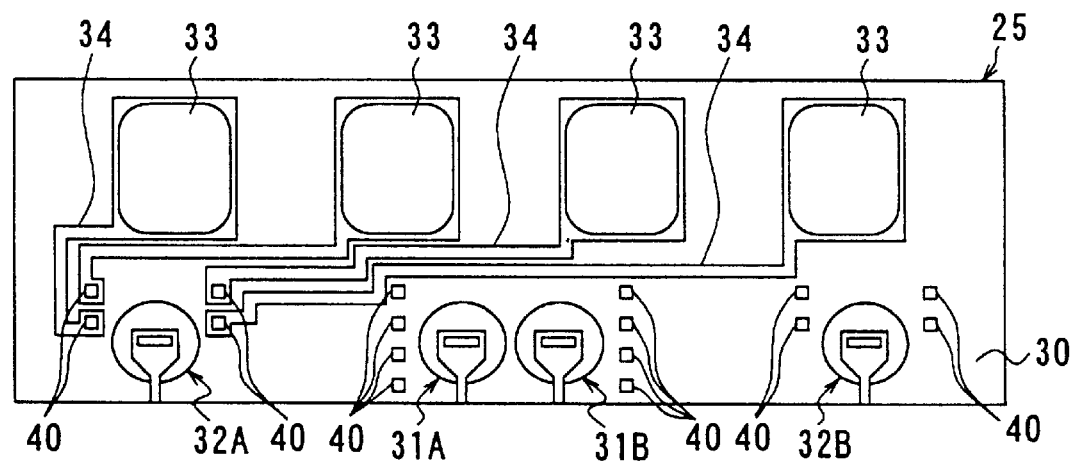
FIG. 22 is a schematic front view of the surface of the up type of the side element type slider of the third embodiment in which thin-film magnetic head element portions are formed.

As shown in FIG. 22, if the intermediate connecting portions 40 of the head element portion 32A are connected to the electrodes 33 through the conductors 34, the up-type thin film magnetic head for the side element type is obtained.

Figure 23:
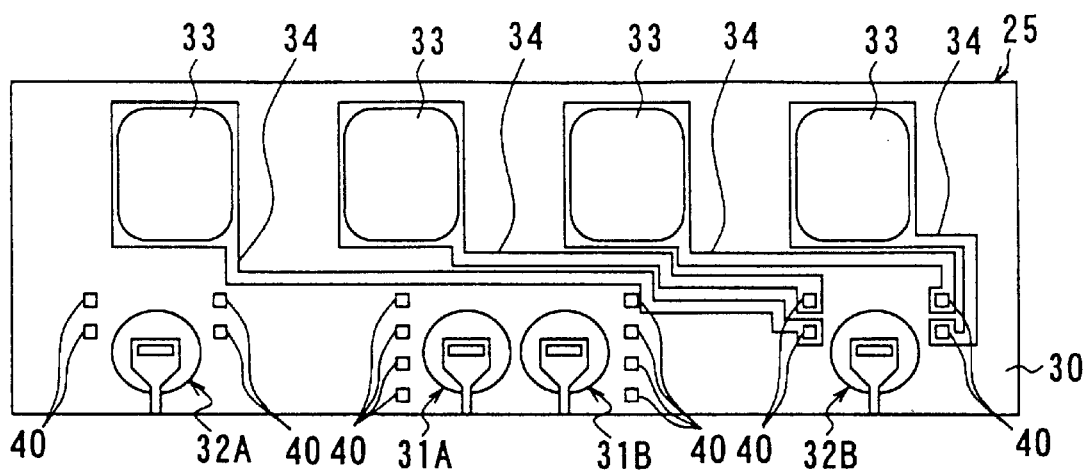
FIG. 23 is a schematic front view of the surface of the down type of the side element type slider of the third embodiment in which thin-film magnetic head element portions are formed.

As shown in FIG. 23, if the intermediate connecting portions 40 of the head element portion 32B are connected to the electrodes 33 through the conductors 34, the down-type thin film magnetic head for the side element type is obtained.

Figure 24:
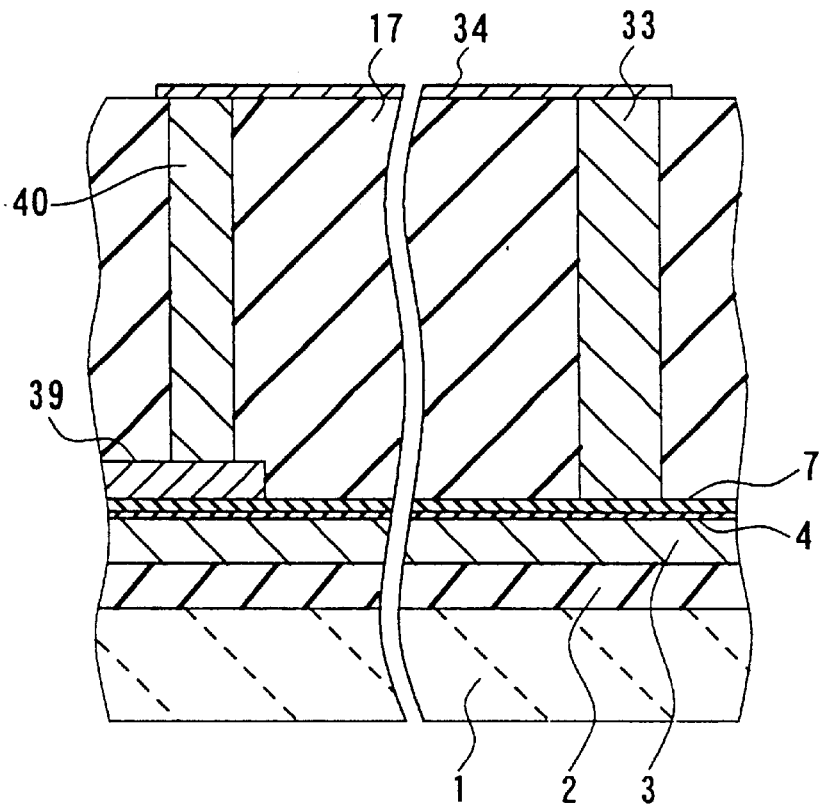
FIG. 24 is a cross section for describing a method of forming the conductors and electrodes of the third embodiment.
Figure 25:
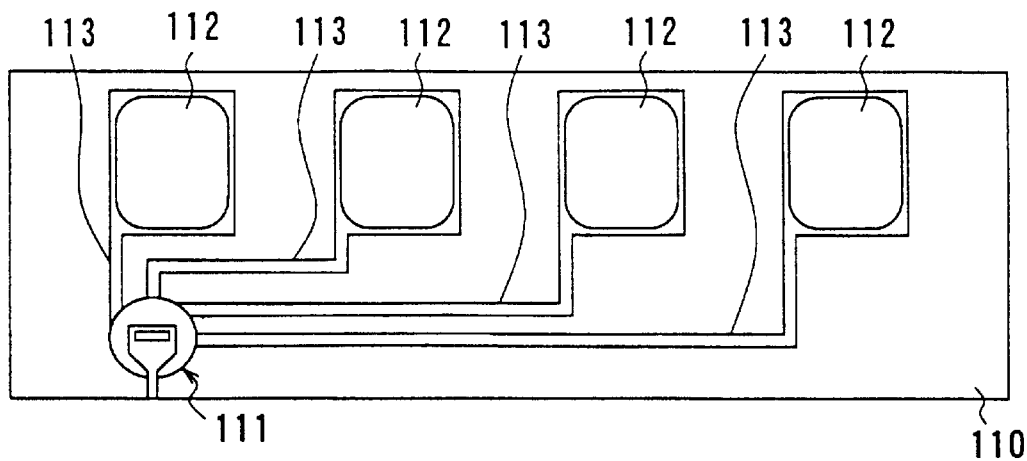
FIG. 25 is a schematic front view of the surface of the side element type slider of related art in which thin-film magnetic head element portions are formed.
Figure 26:
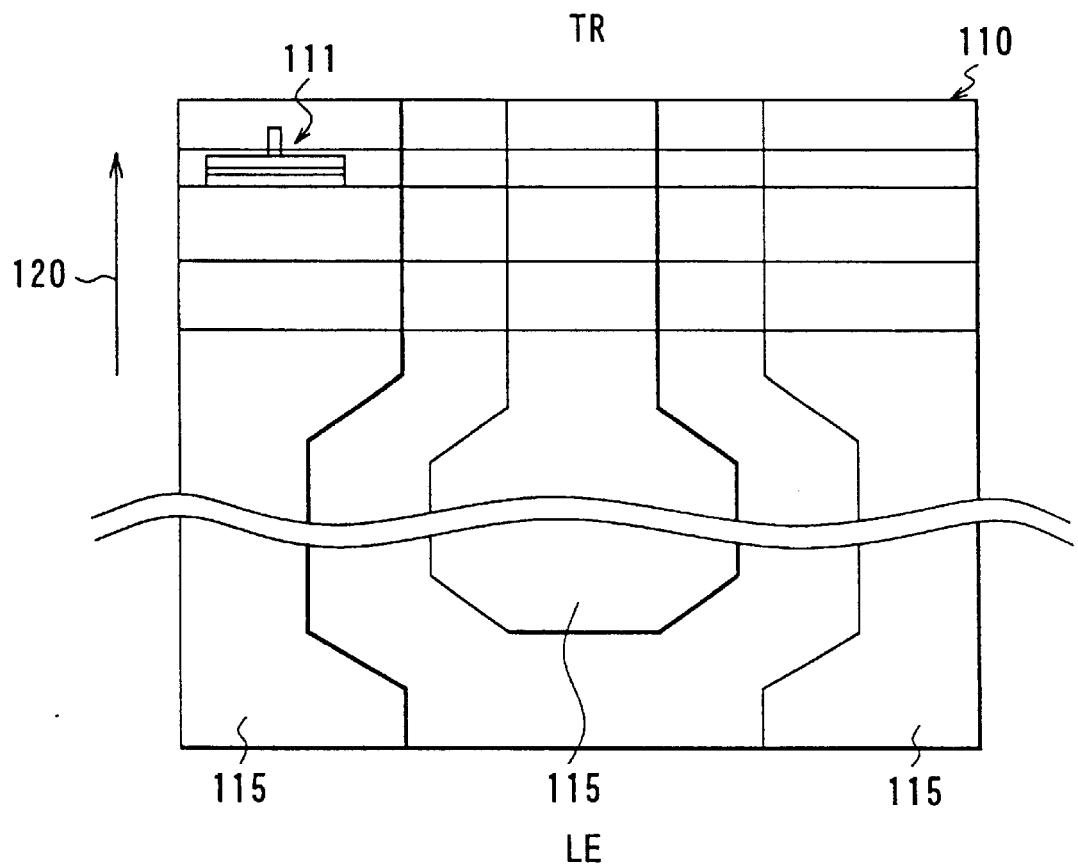
FIG. 26 is a schematic bottom view of the air bearing surface of the side element type slider of related art.
Figure 27:
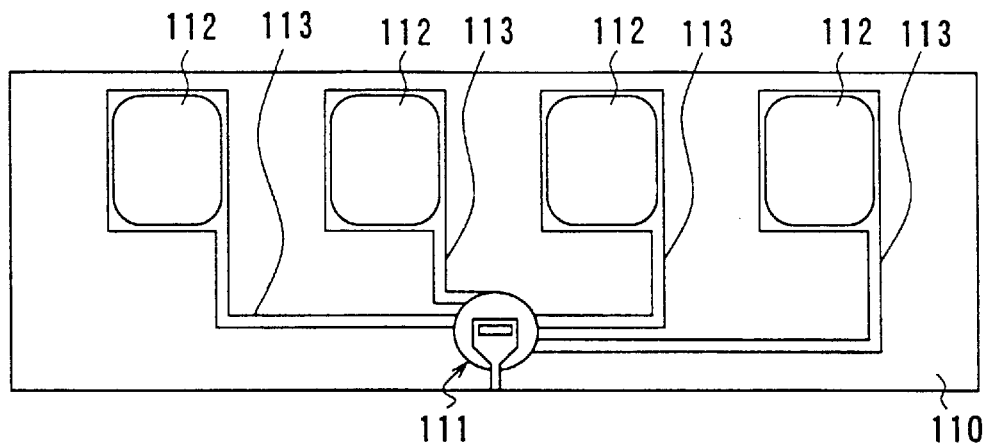
FIG. 27 is a schematic front view of the surface of the center element type slider of related art in which thin-film magnetic head element portions are formed.
Figure 28:
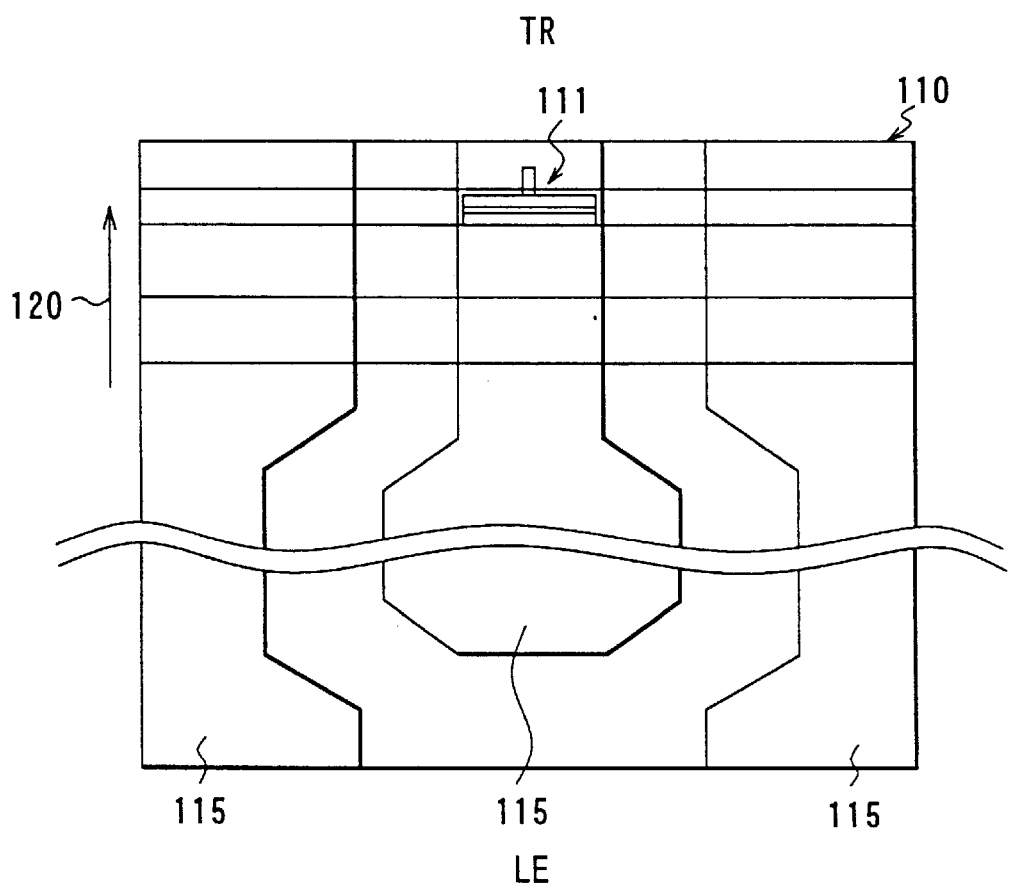
FIG. 28 is a schematic bottom view of the air bearing surface of the center element type slider of related art.
Figure 29:
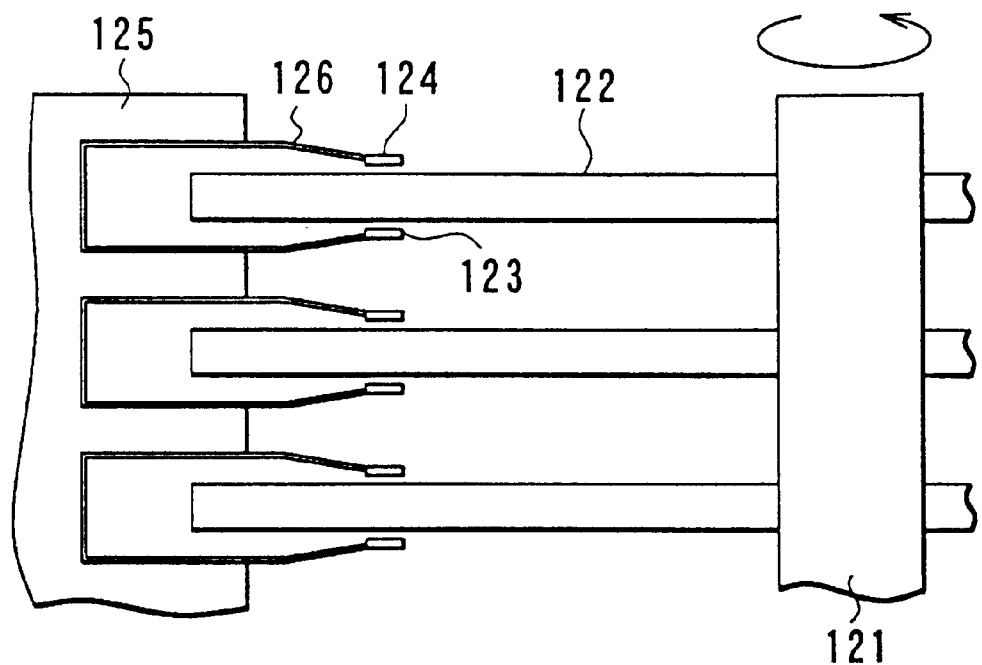
FIG. 29 is an explanatory view for illustrating the arrangement of the thin-film magnetic heads in the hard disk drive in which a plurality of platters are used.

Reference is now made to FIG. 24 to describe a method of forming the intermediate connecting portions 40, the electrodes 33 and the conductors 34 of the embodiment.

In the embodiment, in the steps of forming the thin-film coils 12 and 14, intermediate terminals 39 are formed near the element portions 31A, 31B, 32A and 32B. The intermediate terminals 39 are connected to the thin-film coils 12 and 14 of each of the element portions 31A, 31B, 32A and 32B. The intermediate connecting portions 40 are connected to the intermediate terminals 39. The arrangement of the intermediate terminals 39 is similar to that of the intermediate terminals 37 of the second embodiment. Alternatively, in place of the intermediate terminals 39, contact holes may be formed in the photoresist layers 13 and 15 for providing connection to the thin-film coils 12 and 14.

In the embodiment, after the top pole layer 16 of each of the element portions 31A, 31B, 32A and 32B is formed, and before the overcoat layer 17 is formed, the columnar electrodes (bumps) 33 and the columnar intermediate connecting portions 40, each made of copper, for example, are formed by plating, for example. The lower ends of two of the four intermediate connecting portions 40 are connected to the thin-film coils 12 and 14 through the intermediate terminals 39 or contact holes. The remaining two of the four intermediate connecting portions 40 are each connected to the electrode layer 6 through the contact holes similar to the contact holes 36 of the second embodiment, and further connected to the MR element 5 through the electrode layer 6.

The overcoat layer 17 is then formed to cover the electrodes 33 and the intermediate connecting portions 40. The top surface of the overcoat layer 17 is ground to expose the top surfaces of the electrodes 33 and the intermediate connecting portions 40.

Finally, the conductors 34 are formed on the overcoat layer 17 for connecting the electrodes 33 to the intermediate connecting portions 40 of any of the element portions 31A, 31B, 32A and 32B. The conductors 34 may be formed through sputtering of a conductive material and then patterning the material, using the photomask. If necessary, a protection film may be formed over the conductors 34 except the pad portions used for connection to an external device. Gold (Au) may be sputtered on the pad portions of the conductors 34 for preventing oxidation (rusting).

In the embodiment the intermediate product in the stage immediately before formation of the conductors 34, manufactured through the one series of steps, corresponds to the thin-film magnetic head sub-structure of the invention.

According to the embodiment thus described, the thin-film magnetic head sub-structure is formed through the one kind of process, that is, with the one kind of photomask up to the formation of the overcoat layer 17. On receiving an order from the customer, the conductors 34 are manufactured, in response to the customer's demand, by changing the photomasks for forming the conductors 34 only. The thin-film magnetic head that meets the customer's demand is thereby manufactured. The embodiment thus allows the thin-film magnetic heads that meet specifications required by the customer to be supplied in a brief period of time.

The remainder of configuration, functions and effects of the third embodiment are similar to those of the first or second embodiment.

The invention is not limited to the foregoing embodiments but may be practiced in still other ways. For example, the ends of the conductors 34 may function as electrodes, too, in the third embodiment, instead of providing the columnar electrodes 33.

Although the composite thin-film magnetic heads are described in the foregoing embodiments, the invention may be applied to a thin-film magnetic head dedicated to reproduction, a thin-film magnetic head dedicated to recording, a thin-film magnetic head for recording and reproduction through the use of an induction magnetic transducer, and so on.

The configuration and the manufacturing method of the thin-film magnetic head or the thin-film magnetic head sub-structure may be any configuration and method other than those illustrated in the foregoing embodiments within the scope of the invention.

The arrangement of the thin-film magnetic head element is not limited to the center element type and the side element type described in the foregoing embodiments.

According to the thin-film magnetic head or the method of manufacturing the thin-film magnetic head of the invention thus described, one of a plurality of thin-film magnetic head element portions is selectively and electrically connected to the electrodes through the conductors. As a result, thin-film magnetic heads meeting specifications required by the customer are provided in a short period of time and manufacturing costs are reduced.

According to the thin-film magnetic head sub-structure or the method of manufacturing the thin-film magnetic head sub-structure of the invention, a sub-structure comprising a plurality of element portions may be manufactured. Selected one of the element portions is electrically connected to the electrodes through the conductors, using the sub-structure. As a result, thin-film magnetic heads of several types of specifications may be selectively manufactured. As a result, thin-film magnetic heads meeting specifications required by the customer are provided in a short period of time and manufacturing costs are reduced.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head, including the steps of:

forming a plurality of thin-film magnetic head element portions in a section of a substrate, the section to be a main body of a thin-film magnetic head, each element portion including a main part of a thin-film magnetic head element comprising a read head portion and a write head portion;

forming a plurality of electrodes, in the section of the substrate, for electrically connecting any of the element portions to an external device; and forming a plurality of conductors only between a selected one of the element portions and the electrodes, in the section of the substrate, for electrically connecting the selected one of the element portions to the electrodes.

2. The method according to claim 1, wherein the step of forming the electrodes is performed after the step of forming the conductors.

3. The method according to claim 1, wherein the step of forming the electrodes is performed before the step of forming the conductors.

4. The method according to claim 1, wherein the write head portion includes:

first and second magnetic layers magnetically coupled to each other and each made up of at least one layer and including pole portions placed in regions of the magnetic layers on a side of surfaces thereof facing a recording medium, the pole portions being opposed to each other;

a gap layer placed between the pole portion of the first magnetic layer and the pole portion of the second magnetic layer; and a thin-film coil at least part of which is placed between the first and second magnetic layers, the at least part of the thin-film coil being insulated from the first and second magnetic layers, and wherein one or some of the conductors are connected to the thin-film coil of said selected one of the element portions, the step of forming the element portions including the steps of:

forming the first magnetic layer;

forming the gap layer on the pole portion of the first magnetic layer;

forming the thin-film coil on the first magnetic layer, the coil being insulated from the first magnetic layer; and forming the second magnetic layer on the gap layer and the thin-film coil in such a manner that the second magnetic layer is insulated from the coil.

5. The method according to claim 4, wherein the step of forming the conductors is performed simultaneously with the step of forming the thin-film coil.

6. The method according to claim 4, wherein the step of forming the conductors is performed simultaneously with the step of forming the second magnetic layer.

7. The method according to claim 4 wherein the step of forming the conductors is performed after the step of forming the second magnetic layer.

8. The method according to claim 1, wherein the read head portion comprises a magnetoresistive element, and one or some of the conductors are connected to the magnetoresistive element of said selected one of the element portions.

9. The method according to claim 1, further including before the step of forming the conductors, the step of:

forming intermediate connecting portions for the respective thin-film magnetic head element portions, connected to the element portions, to which the conductors are selectively connected, wherein the conductors are connected to the intermediate connecting portions corresponding to selected one of the element portions.

10. The method according to claim 1, wherein the main body includes a surface facing a recording medium and part of each of the element portions is placed in the surface facing the recording medium in the step of forming the element portions.

* * * * *